(12) United States Patent
Nakano et al.

(10) Patent No.: US 7,773,140 B2
(45) Date of Patent: Aug. 10, 2010

(54) STEREO IMAGE-PICKUP APPARATUS

(75) Inventors: Norihiko Nakano, Fujisawa (JP); Shinichiro Hirooka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 810 days.

(21) Appl. No.: 11/543,354

(22) Filed: Oct. 4, 2006

(65) Prior Publication Data

US 2007/0076112 A1    Apr. 5, 2007

(30) Foreign Application Priority Data

Oct. 5, 2005    (JP) .............................. 2005-291900

(51) Int. Cl.
*H04N 3/14* (2006.01)
*H04N 5/335* (2006.01)
(52) U.S. Cl. ...................................... 348/312; 348/311
(58) Field of Classification Search .................. 348/42, 348/49, 50, 295, 311, 312
See application file for complete search history.

(56) References Cited

U.S. PATENT DOCUMENTS

2002/0113865 A1* 8/2002 Yano et al. .................... 348/47
2004/0233275 A1* 11/2004 Tomita ........................ 348/51
2005/0134709 A1* 6/2005 Ishii et al. .............. 348/240.99

FOREIGN PATENT DOCUMENTS

JP    07-007653    1/1995
JP    2000-341719    12/2000

* cited by examiner

*Primary Examiner*—Kelly L Jerabek
(74) *Attorney, Agent, or Firm*—Townsend and Townsend and Crew LLP

(57) ABSTRACT

A stereo image pickup apparatus having a plurality of image pickup units, an input selection unit for executing a selection processing of an input signal, a sensor driving signal generation unit for driving the image pickup units, and a camera signal processing unit for executing camera signal processing of output data of the image pickup units. The plural image pickup units simultaneously execute exposure and the sensor driving signal generation unit executes mask control of the driving signal and makes different the output timing of the image pickup data from the image pickup unit. The camera signal processing of the image data outputted from the image pickup units can be carried out by a smaller number of camera signal processing units than the image pickup units.

28 Claims, 18 Drawing Sheets

3-A: EXPOSURE AND DATA OUTPUT TIMING

3-B: DATA INPUT TIMING TO CAMERA SIGNAL PROCESSING UNIT

7-A: EXPOSURE, SHUTTER OPENING/CLOSING TIMING AND DATA OUTPUT TIMING

STEREO IMAGE-PICKUP APPARATUS

INCORPORATION BY REFERENCE

The present application claims priority from Japanese application JP2005-291900 filed on Oct. 5, 2005, the content of which is hereby incorporated by reference into this application.

BACKGROUND OF THE INVENTION

This invention relates to an image pickup apparatus having a plurality of image pickup means.

JP-A-7-7653 (Document 1), for example, describes the background art of concern. It is an object of Document 1 "to provide a multi-output image pickup apparatus having lower power consumption, smaller capacity and lower cost than before by processing signals from a plurality of image pickup devices by a smaller number of signal processors than the number of the image pickup devices" and Document 1 discloses the following technology as a solution.

"Signals from n solid state image pickup devices are allocated by a first signal selection circuit to k image signal processors. After processed by the image signal processors, the k signals are allocated by a second signal selection circuit to m output devices. Signal selection by the first and second signal selection circuits is executed by a control circuit. Control data of the image signal processor corresponding to each image pickup device connected to the first signal selection circuit is stored in the control circuit. Connection of the selected image pickup device among the n image pickup devices and the selected output device among the m output devices is stored in the control circuit, too".

JP-A-2000-341719 (Document 2) is also known which aims "to acquire a stereo camera that synchronizes a plurality of cameras without using an external synchronization circuit and outputs image signals with less variance of luminance" and discloses the following construction as a solution.

"In a stereo camera having a plurality of image pickup systems including lenses 2a, 2b, image pickup devices 3a, 3b, gain control means 4a, 4b for amplifying output signals of the image pickup devices and signal processing means 5a, 5b for converting the output signals of the image pickup devices to image signals, the stereo camera has timing signal generation means 6b for outputting a driving signal for commonly driving a plurality of image pickup devices and the signal processing means and a composite sync signal, etc, and exposure adjustment means 7b constituted by exposure detection means 8b for detecting an image pickup device output signal and exposure time calculation means 9b for calculating an exposure adjustment value from the detection value outputted from the exposure detection means and a predetermined exposure adjustment target value, wherein the timing signal generation means is controlled by the output of the exposure time calculation means.

SUMMARY OF THE INVENTION

Techniques for picking up a stereo image by using a plurality of cameras and extracting a subject are well known in monitor cameras and three-dimensional cameras, for example. In this instance, the signal processing operation by using a smaller number of signal processors than the number of the image pickup devices as described in Document 1 is effective to constitute an economical and low power consumption image pickup system.

However, there is the case where a subject having quick and vigorous motion is taken as an image to be picked up. To be able to take a stereo image and to accurately extract the subject by using a plurality of cameras in such a case, it is effective to synchronize a plurality of cameras and to align the timings of exposure periods and align the centers of gravity of the exposure periods. Since Document 1 does not consider aligning or agreement of the exposure periods for imaging and the timings of the exposure periods, however, the timing error of imaging occurs between the cameras and accuracy drops when the image processing is executed by using the images picked up.

Document 2 discloses a method that synchronizes the image pickup operations among the cameras and brings the exposure periods to coincide with each other by inputting the same driving signal to a plurality of image pickup devices. According to Document 2, however, since the signals are simultaneously outputted in parallel with one another from a plurality of image pickup devices, the same number of signal processing means as the number of image pickup devices are necessary and the cost increases accordingly.

It is therefore an object of the invention to reduce the cost and to improve image quality in an image pickup apparatus having a plurality of image pickup means.

The object described above can be accomplished by the inventions described in the appended claims.

Other objects, features and advantages of the invention will become apparent from the following description of the embodiments of the invention taken in conjunction with the accompanying drawings.

DESCRIPTION OF THE EMBODIMENTS

Some embodiments of the invention will be hereinafter explained with reference to the accompanying drawings.

Embodiment 1

Figure 1:
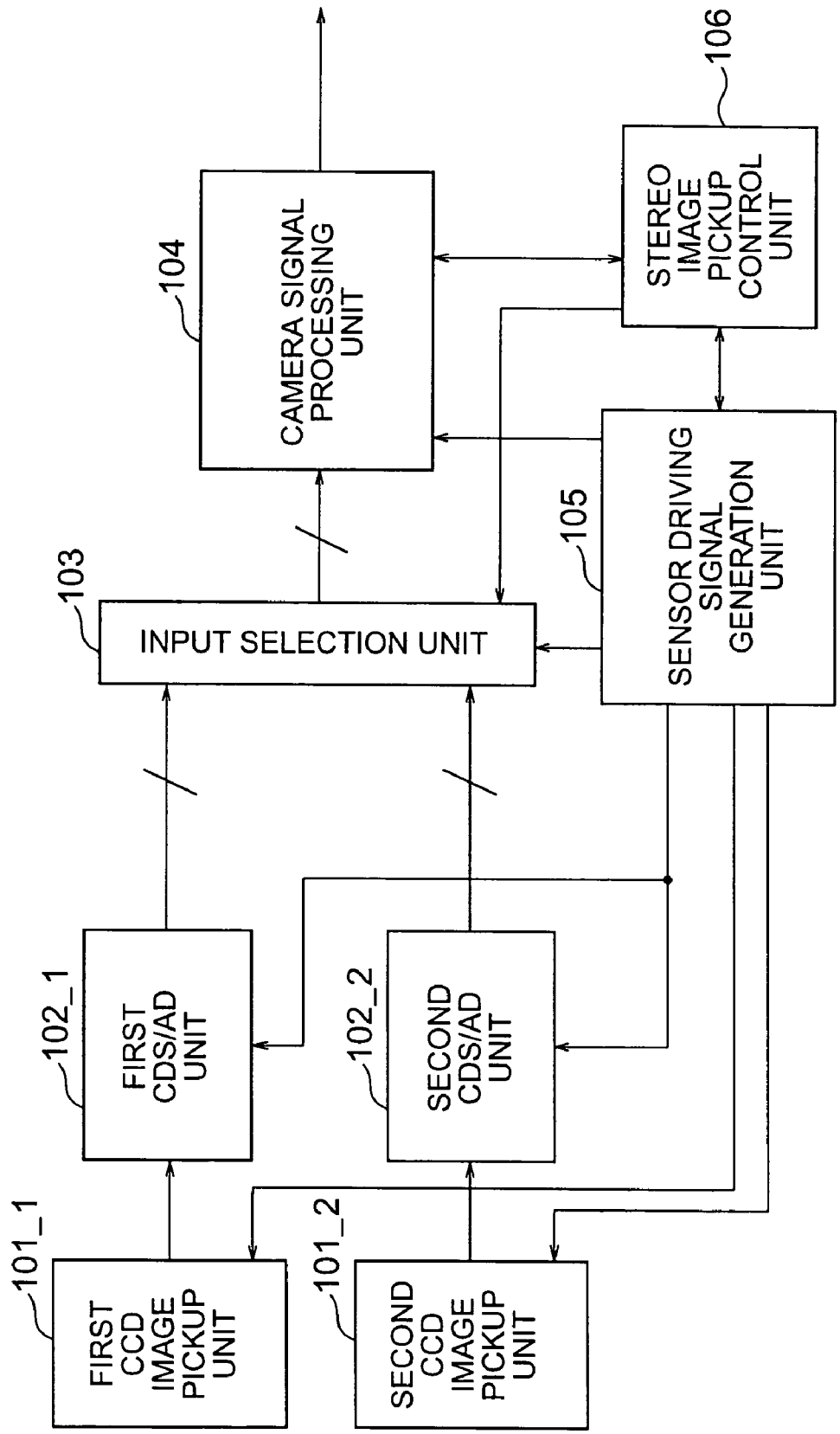
FIG. 1 is a schematic view showing a stereo image pickup system according to a first embodiment of the invention.

FIG. 1 is a schematic view showing a stereo image pickup system according to the first embodiment of the invention. In the drawing, reference numeral 101-1 denotes a first CCD image pickup unit. Reference numeral 101-2 denotes a second CCD image pickup unit. Reference numeral 102-1 denotes a first CDS/AD unit. Reference numeral 102-2 denotes a second-CDS/AD unit. Reference numeral 103 denotes an input selection unit. Reference numeral 104 denotes a camera signal processing unit. Reference numeral 105 denotes a sensor driving signal generation unit. Reference numeral 106 denotes a stereo image pickup control unit.

In the stereo image pickup system, the first CCD image pickup unit 101-1 executes image pickup by photoelectric conversion and outputs a first analog signal. The first CDS/AD unit 102-1 executes correlative double sampling and AD conversion for the first analog signal outputted by the first CCD image pickup unit 101-1 and outputs a first digital signal. The second CCD image pickup unit 101-2 executes image pickup by photoelectric conversion and outputs a second analog signal. The second CDS/AD unit 102-2 executes correlative double sampling and AD conversion for the second analog signal outputted by the first CCD image pickup unit 101-2 and outputs a second digital signal. In the stereo image pickup system shown in FIG. 1, the first CCD image pickup unit 101-1 and the second CCD image pickup unit 101-2 respectively use the dedicated first and second CDS/AD units 102-1 and 102-2. Therefore, sampling of a black level as a reference can be discretely made for the analog signal outputted from each CCD image pickup unit and image quality can be improved. The input selection unit 103 executes a selection processing for the first digital signal outputted by the first CDS/AD unit 102-1 and the second digital signal outputted by the second CDS/AD unit 102-2 by using the sensor driving signal 105 or the control signal from the stereo image pickup control unit 106 and selects and outputs one of these digital signals. When the control signal from the sensor driving signal generation unit 105 is used for the selection processing executed by the input selection unit 103, input switching in a field unit can be easily made by using a field pulse :FP used for discriminating an even-numbered field and an odd-numbered field and input switching in a line unit can be easily made by using a sync signal :HD in the horizontal direction.

In the stereo image pickup system shown in FIG. 1, the input selection unit is arranged in the post stage of the first CDS/AD unit 102-1 and the second CDS/AD unit 102-2. However, it is possible to gather the CDS AD/units into one unit and to reduce the cost by arranging the input selection unit in the post stage of the first CCD image pickup unit 102-1 and the second CCD image pickup unit 102-2. The camera signal processing unit 104 executes various camera signal processing such as filter processing, de-mosaic processing, carrier removal processing, enhancement processing, etc, for the selected digital signal outputted by the input selection unit 103 and outputs an image signal. The sensor driving signal generation unit 105 generates a signal for driving or control and outputs the signal to the first CCD image pickup unit 101-1 and the first CDS/AD unit 102-1, the second CCD image pickup unit 101-2 and the second CDS/AD unit 102, the input selection unit 103, the camera signal processing unit 104 and the stereo image pickup control unit 106. The stereo image pickup control unit 106 controls the input selection unit 103, the camera signal processing unit 104 and the sensor driving signal generation unit 105.

Figure 2:
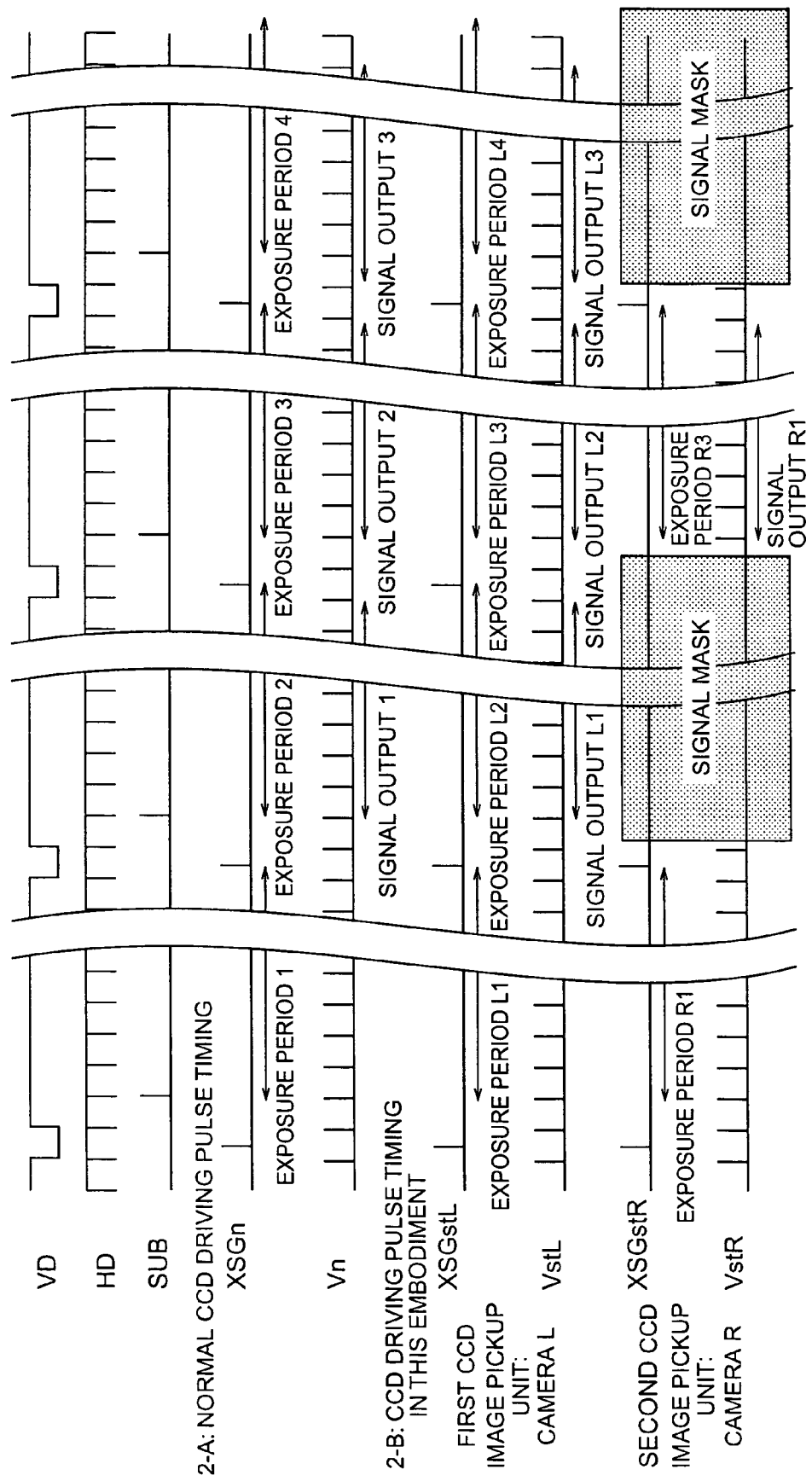
FIG. 2 is a view showing an example of CCD driving pulses of the stereo image pickup system according to the first embodiment of the invention.

FIG. 2 is a view showing an example of CCD driving pulses of the stereo image pickup system according to the first embodiment of the invention. In FIG. 2, reference numeral 2-A denotes an ordinary CCD driving pulse timing and reference numeral 2-B denotes a CCD driving pulse for a camera L as the first CCD image pickup unit 101-1 and a camera R as the second CCD image pickup unit 101-2.

In FIG. 2, symbol VD represents a sync signal in the vertical direction and symbol HD does a sync signal in the horizontal direction. Symbol SUB represents a substrate clock signal and symbol XSGn does an ordinary read clock signal. Symbol Vn represents an ordinary vertical register transfer clock and symbol XSG2 does a read clock signal for the camera L. Symbol VstL represents a vertical register transfer clock and symbol XSGstR represents a read clock signal for the camera R. Symbol VstR represents a vertical register transfer clock for the camera R.

In 2-B of FIG. 2 using the stereo image pickup system of this embodiment, a mask pulse of the signals XSGstR and VstR of the camera R are fixed after the exposure period R1 in comparison with the driving pulse represented at the ordinary CCD driving pulse timing of 2-A in FIG. 2. Consequently, while the mask pulse of the signal VstR of the camera R is fixed, the charge/signal imaged during the exposure period R1 can be stored in the vertical CCD of the second CCD image pickup unit 101-2. Therefore, when the ordinary CCD driving pulse timing is employed, the timing of the signal output imaged during the exposure period R1 and outputted at the timing of the signal output 1 can be deviated or retarded from the timing of the signal output R1. In other words, the data exposed simultaneously in the exposure period L1 and the exposure period R1 by the cameras L and R can be outputted at different timing. The period in which the mask pulse of this signal is fixed can easily accomplish the 1-field period or 1-sampling period by using pulses of a V system such as VD, XSGstL or XSGstR, FP, and so forth. The SUB signal does not fix the mask pulse with respect to the camera R. This is to prevent in advance the exposure period getting elongated for fixing the mask pulse for XGSstR and the overflow of the charge/signal from the image pickup device of the CCD, thereby deteriorating image quality, by discarding the charge/signal by the signal of SUB. Though FIG. 2 shows the vertical register transfer clock as one signal, the vertical register transfer clock may well be a plurality of vertical register transfer clock. Though FIG. 2 shows the pulse output of VstR after XSGstR as one output, the number of pulse outputs is not limited in particular. The logic of the signals shown in FIG. 2 may well be different from the logic shown in the drawing. The SUB may inputs signals at different timing between the camera L and the camera R or XSGstL and XSGstR may input signals of different timing, respectively. In consequence, the timing of the center of gravity of the exposure period between the camera R and the camera L can be brought into coincidence. In the case where the exposure period is different between the camera L and the camera R, too, the output timing of the signals of the camera R can be deviated or retarded by fixing the mask pulse of the signals of XSGstR and VstR of the camera R after the exposure period R1.

Figure 3:
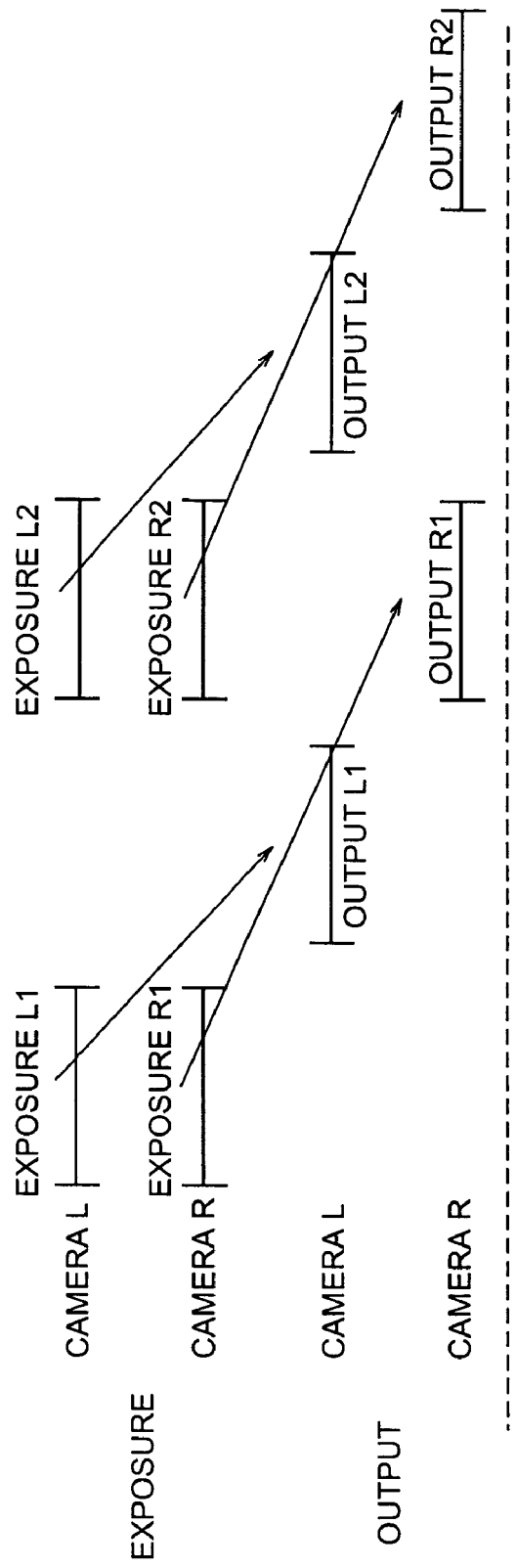
FIG. 3 is a view showing an example of exposure and signal processing timing of the stereo image pickup system according to the first embodiment of the invention.

FIG. 3 is a view showing an example of the exposure of the stereo image pickup system according to the first embodiment of the invention and the signal processing timing. In FIG. 3, reference numeral 3A denotes exposure and data output and 3B denotes the data input timing to the camera signal processing unit.

FIG. 2 2-B:

When the CCD driving pulse timing of this embodiment is used, the data simultaneously exposed by the camera L and the camera R can be outputted at different timing as shown in 3A: exposure and data output timing. The input selection unit switches a signal selected at a timing which is made to coincide with the timing of the output data outputted at different timing from the camera L and the camera R as shown in 3B: data input timing to the camera signal processing unit. Timing control of the switching processing of the signal to be selected can be easily achieved by using the control signal from the stereo image pickup control unit 106 or the FP signal. In FIG. 2 described above, the period in which the mask pulse of the signals of XSGstR and VstR of the camera R in FIG. 2 may be the period in which the input selection unit 103 selects the first digital signal outputted by the first CDS/AD unit by using the first analog signal outputted by the camera L as the first CCD image pickup unit 101-1.

When the input selection unit 103 executes the selection processing corresponding to the signal output timing of the camera L and the camera R, the input signal to the camera signal processing unit 104 can be switched on the time division basis as represented by the data input timing to the camera signal processing unit in FIG. 3-3B. Consequently, the signal processing can be made by one camera signal processing means for the two CCD image pickup units conducting simultaneous exposure. It is therefore possible to reduce the cost by deletion of the signal processing unit and to improve image quality by simultaneous exposure and accuracy when the image processing is executed by using the pickup image. The first CCD image pickup unit 101-1 and the second CCD image pickup unit 101-2 may use a CCD capable of progressive readout. When a CCD capable of outputting 60 frame images per second is used for progressive readout, the input selection unit 103 executes the alternative selection processing. In consequence, even when the input rate to the camera signal processing unit 104 per camera drops such as when the selection is alternately made by the camera L and the camera R, 30 frame images can be obtained per camera in the same way as when an interlace readout CCD is used.

Figure 4:
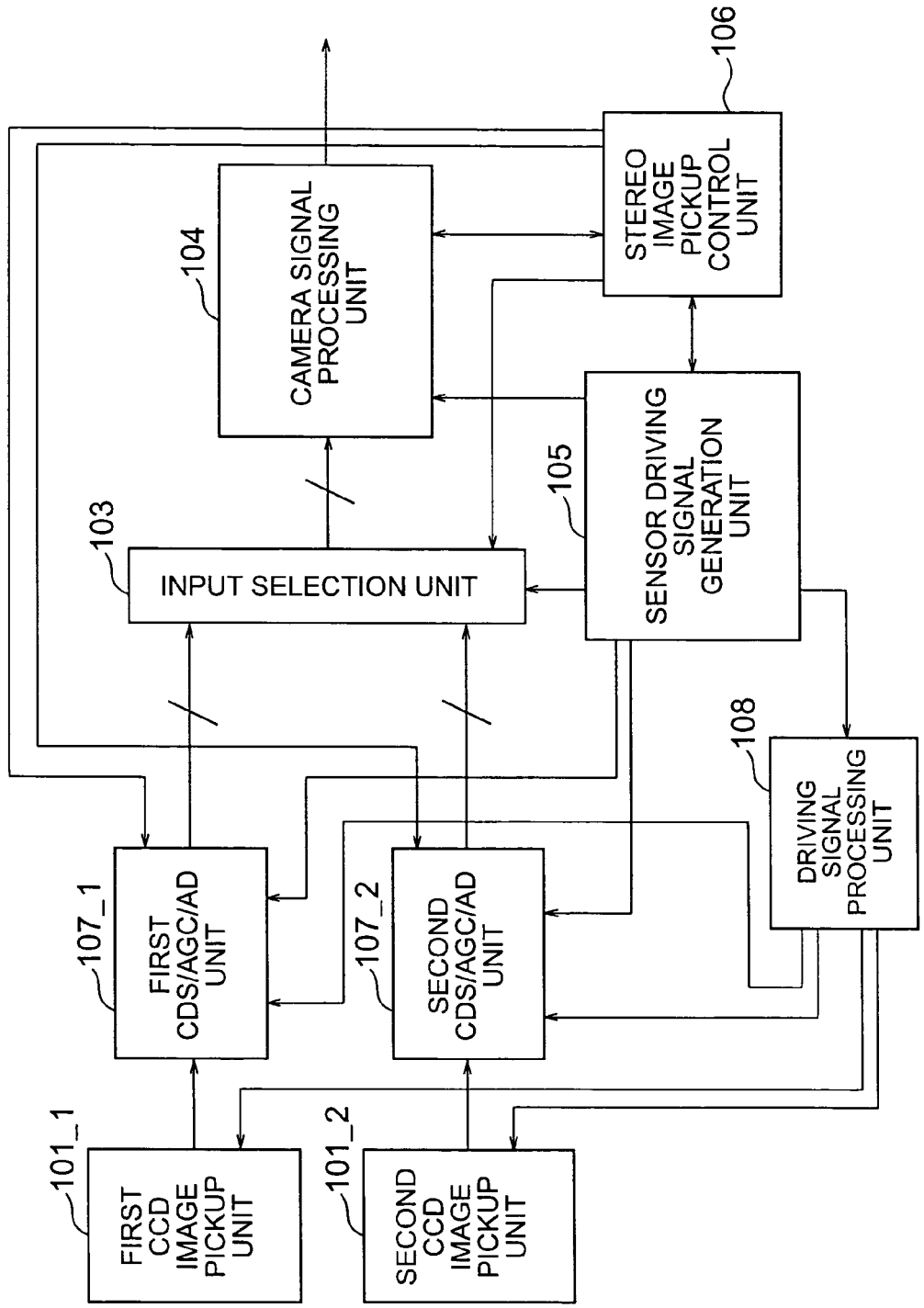
FIG. 4 is a schematic view showing another form of the stereo image pickup system according to the first embodiment of the invention.

FIG. 4 is a schematic view showing another form of the stereo image pickup system according to the first embodiment of the invention. In FIG. 4, reference numeral 107-1 denotes a first CDS/AGC/AD unit. Reference numeral 107-2 denotes a second CDS/AGS/AD unit. Reference numeral 108 denotes a driving signal processing unit.

In comparison with the schematic view of FIG. 1, the first CDS/AD unit 102-1 in FIG. 4 is changed to the first CDS/AGC/AD unit 107-1, the second CDS/AD unit 102-2 is changed to the second CDS/AGC/AD unit 107-2 and the first CDS/AGC/AD unit 107-1 and the second CDS/AGC/AD unit 107-2 can control the gain of the first analog signal outputted by the first VVD image pickup unit and the gain of the second analog signal outputted by the second CDS/AGC/AD unit 107-2, respectively. To execute the gain control in FIG. 4, the stereo image pickup control unit 104 applies the control signals to the first CDS/AGC/AD unit 107-1 and the second CDS/AGC/AD unit 107-2. In comparison with the schematic view of FIG. 4, further, the system includes the driving signal processing unit 108 in FIG. 4. The signal outputted by the sensor driving signal generation unit 105 is directly inputted to the first CCD image pickup unit 101-1 and the second CCD image pickup unit 101-2 in FIG. 1. Therefore, the sensor driving signal generation unit 105 must execute the mask processing of the driving signal described above. Since two kinds of sensor driving signals must be outputted, the specific sensor driving signal generation unit 105 must be used. In this construction, one kind of the ordinary CCD driving pulse outputted from the sensor driving signal generation unit 105 is inputted to the driving signal processing unit 108 and the sensor driving signal subjected to the distribution processing and the mask processing in the driving signal processing unit 108 is outputted to the first CCD image pickup unit 101-1 and the second CCD image pickup unit 101-2. The driving signal processing unit 108 for executing such distribution processing and mask processing can be readily accomplished by using an FPGA. Consequently, the signal processing can be made by one camera signal processing means for the two CCD image pickup units executing simultaneous exposure by using the general purpose sensor driving signal processing unit 108.

Further, in comparison with the schematic view of FIG. 1, the control signal to the CDS/AGC/AD units is inputted to the driving signal processing unit 108 in FIG. 4 and the driving signal processing unit 108 can process and output the control signal. In comparison with the schematic view of FIG. 1, the individual control signals are outputted from the sensor driving signal generation unit 105 to the first CDS/AGC/AD unit 107-1 and the second CDS/AGC/AD unit 107-2 in FIG. 4. The CDS/AGS/CD units execute the correlative double sampling processing by using the two kinds of sampling signals. Because this processing is greatly affected by the delay of the analog signals, it is difficult to improve image quality by conducting the correlative double sampling processing for the first CDS/AGC/AD unit 107-1 and the second CDS/AGC/AD unit 107-2 by using the same sampling signal owing to the strong influences of the differences of the substrate characteristics between the first CCD image pickup unit 101-1 and the first CDS/AGC/AD unit 107-1 and between the second CCD image pickup unit 101-2 and the second CDS/AGC/AD unit 107-2. When the individual control signals are outputted from the sensor driving signal generation unit 105 to the first CDS/AGC/AD unit 107-1 and the second CDS/AGC/AD unit 107-2 as shown in FIG. 4, the sampling signal can be adjusted in accordance with the substrate characteristics and image quality can be improved. The signals not subjected to the mask processing among those inputted to the driving signal processing unit 108 may be inputted to the respective CCD image pickup units and the respective CDS/AGC/AD units by distributing the signals outputted from the sensor driving signal generation unit 105.

As described above, the image pickup data simultaneously exposed can be subjected to the camera signal processing at a single camera signal processing unit by masking the vertical transfer signal and readout signal to the CCD image pickup unit after simultaneous exposure so as to deviate the signal output timing so that the input signal to the camera signal processing unit may be selected at a timing which is brought to coincide with the signal output timing. It is thus possible to reduce the cost and to improve image quality by simultaneous exposure and the image processing capacity of stereo image pickup when the image processing is made by using the image picked up.

Embodiment 2

Figure 5:
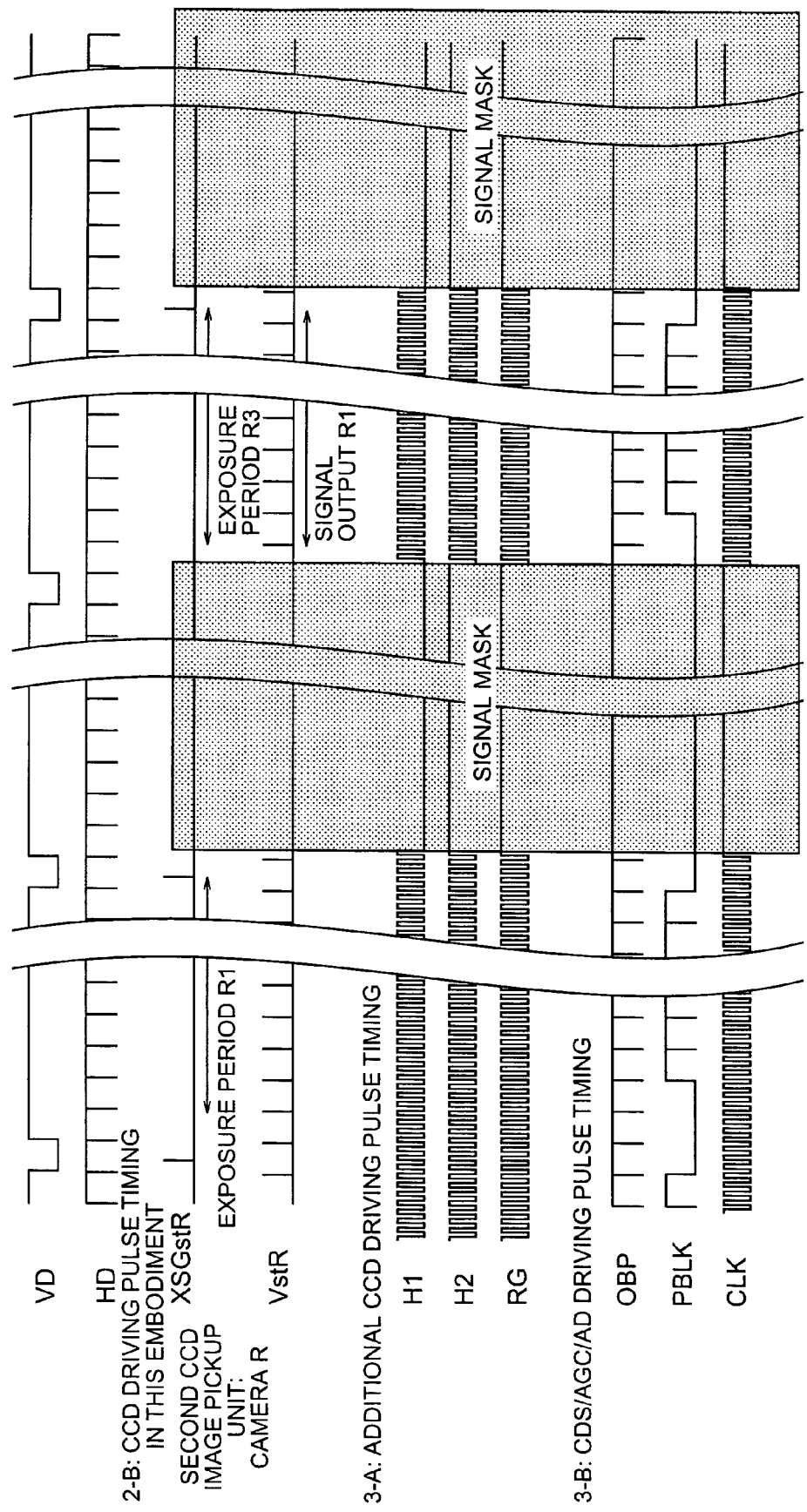
FIG. 5 is a view showing an example of CCD driving pulses of a stereo image pickup system according to a second embodiment of the invention.

FIG. 5 is a view showing an example of CCD driving pulses of stereo image pickup system according to the second embodiment of the invention. In FIG. 5, reference numerals H1 and H2 denote horizontal register transfer clocks and RG denotes a reset gate clock. OBP denotes a black reference level sampling control signal. PBLK denotes a pre-blanking signal and CLK denotes a clock signal.

In FIG. 5, the mask pulse of the OBP signal outputted to the second CDS/AD unit or the second CDS/AGC/AD unit is fixed in the period in which the mask pulse of the signals XSGstR and VstR of the camera R is fixed. Consequently, it is not possible to sample the reference level of black by the second CDS/AD unit or the second CDS/AGC/AD unit by using an illegal signal during the period in which the signal image-picked from the second image pickup unit is not outputted, and image quality can be improved.

In FIG. 5, the mask pulses of the H1, H2 and RG signals outputted to the second CCD image pickup unit and the PBLK and CLK signals outputted to the second CDS/AD unit or the second CDS/AGC/AD unit are mask-fixed in the period in which the mask pulses of the signals XSGstR and VstR of the camera R are mask-fixed. Consumed power can be reduced by fixing the mask-pulse of unnecessary signals. The logic of the signals shown in FIG. 5 may be different from the logic shown in the drawing. The system may use the form in which some of the signals described above are masked. Similarly, when the camera L is not selected by the input selection unit, the driving pulses and the control signals for the first CCD image pickup unit, the first CDS/AD unit or the first CDS/AGC/AD unit may be masked and fixed.

As described above, the second embodiment can achieve high image quality by masking the reference level sampling control signal of black for the CDS/AGC/AD unit when the vertical transfer signal and the readout signal for the CCD image pickup unit after simultaneous exposure are masked, and can achieve lower power consumption by masking the horizontal register transfer clock and the reset gate clock for the CCD image pickup unit and the pre-blanking signal and the clock signal for the CDS/AGC/AD unit.

Embodiment 3

Figure 6:
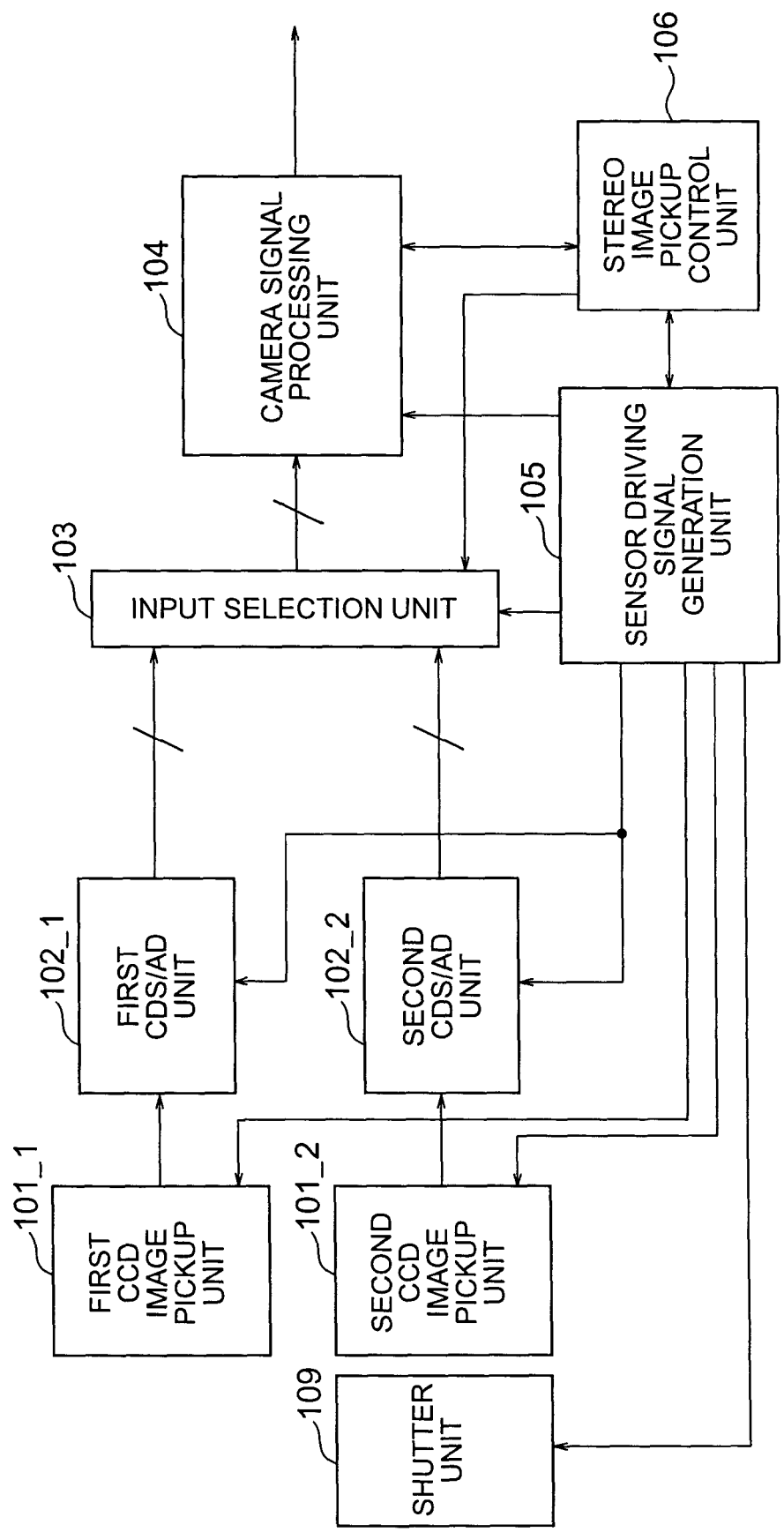
FIG. 6 is a schematic view showing a stereo image pickup system according to a third embodiment of the invention.

FIG. 6 is a schematic view showing a stereo image pickup system according to the third embodiment of the invention. Reference numeral 109 in FIG. 6 denotes a shutter unit.

In comparison with FIG. 1 that is the schematic view of the first embodiment of the invention, the system shown in FIG. 6 has the shutter unit 109. The shutter unit 109 executes shutter control by using the signal from the sensor driving signal generation unit 105 or the stereo image pickup control unit 106 and regulates incident light to the second CCD image pickup unit 102-2.

Figure 7:
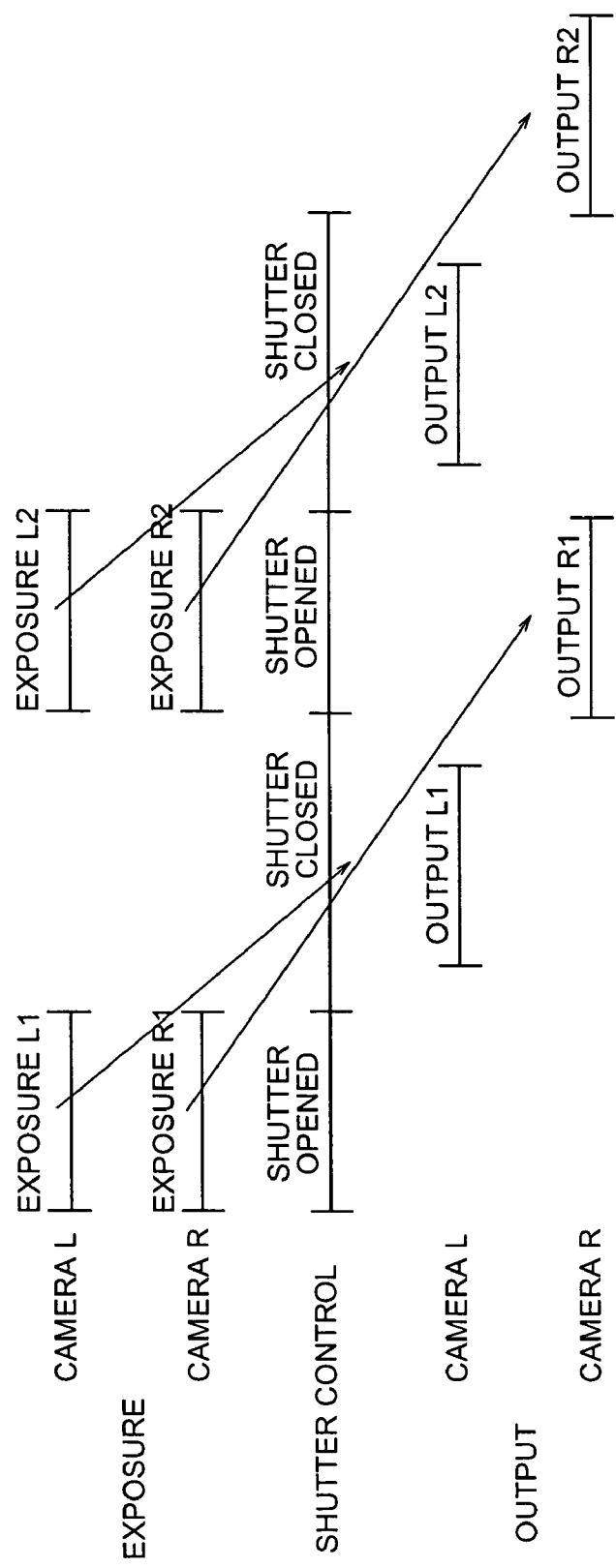
FIG. 7 is a view showing an example of exposure, shutter opening/closing timing and data output timing of the stereo image pickup system according to the third embodiment of the invention.

FIG. 7 shows an example of exposure, shutter opening/closing timing and data output timing in the third embodiment of the invention.

In comparison with FIG. 3 showing an example of exposure and signal processing timing of the stereo image pickup system according to the first embodiment of the invention, shutter control timing is added in FIG. 7. When strong light is incident into the second CCD image pickup unit while the vertical CCD holds the charge/signal by masking the vertical transfer signal and the readout signal to the camera R after simultaneous exposure, the charge sometimes leaks into the vertical CCD and invites the occurrence of noise. In this embodiment, light incident into the second CCD image pickup unit is masked by closing the shutter in the period in which the vertical transfer signal and the readout signal are masked and the period in which exposure is not executed. In this way, the occurrence of noise can be prevented even when strong light is incident into the camera R while the vertical CCD holds the charge/signal.

As described above, this embodiment can cut off incident light by closing the shutter while the vertical CCD holds the charge and the signal by masking the vertical transfer signal and the readout signal and can execute high image quality image pickup without generating the noise.

Embodiment 4

Figure 8:
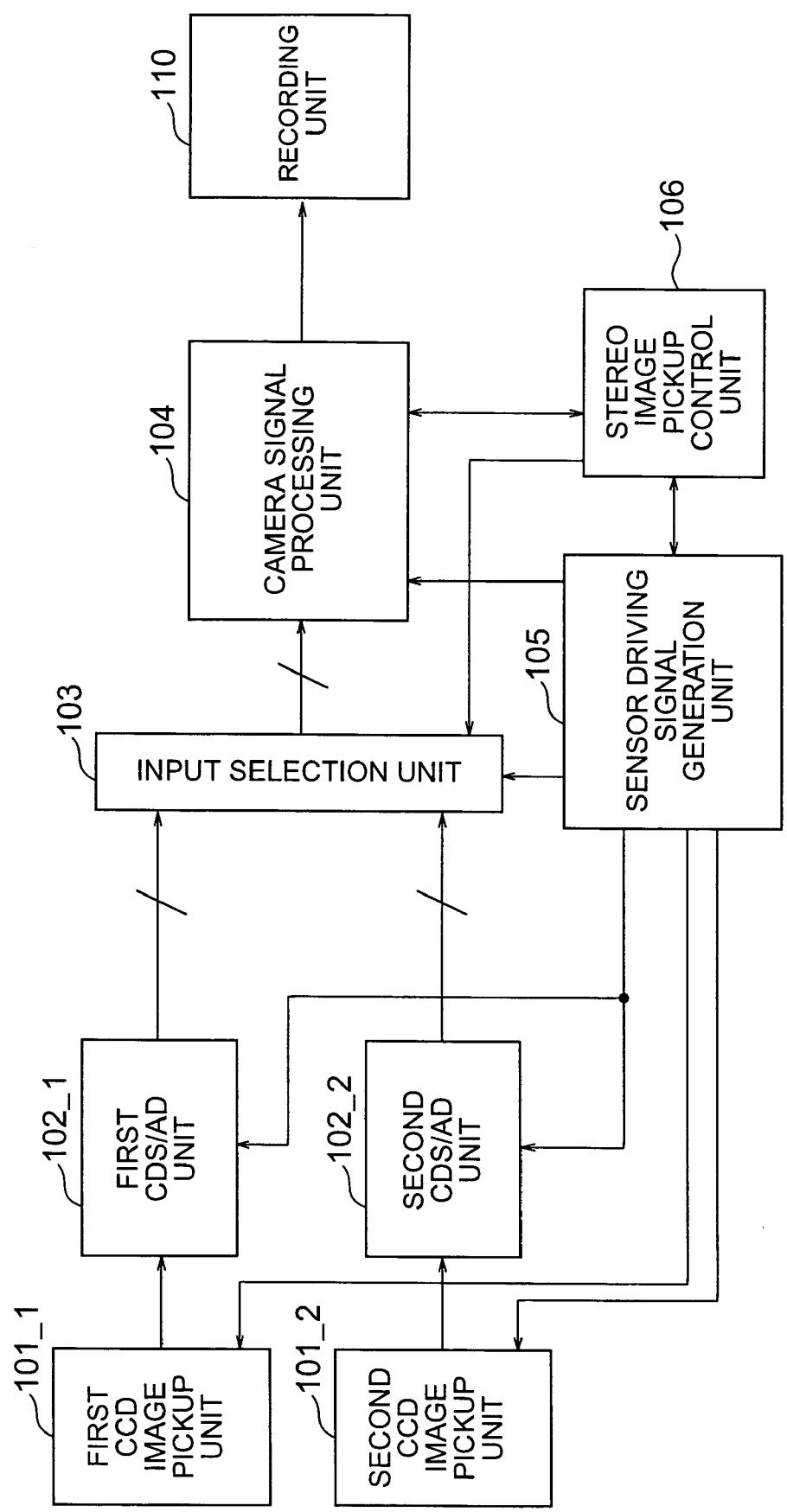
FIG. 8 is a schematic view showing a stereo image pickup system according to a fourth embodiment of the invention.

FIG. 8 is a schematic view showing a stereo image pickup system according to the fourth embodiment of the invention. Reference numeral 110 in FIG. 8 denotes a recording unit.

In comparison with FIG. 1 that is the schematic view of the first embodiment, the system shown in FIG. 8 has a recording unit 110. The recording unit 110 executes a recording processing of image signals outputted by the camera signal processing unit 104. In comparison with the image signal picked up by the first CCD image pickup unit 101-1, the image signal picked up by the second CCD image pickup unit 101-2 is affected by the noise while the vertical CCD holds the charge/signal by masking the vertical transfer signal and the image signal. Therefore, when the image signal is recorded by the recording unit 110, the image signal picked up by the first CCD image pickup unit 101-1 is preferentially recorded. When only one of the image signals is recorded, for example, the image signal picked up by the first CCD image pickup unit 101-1 is recorded. Consequently, the image having high image quality can be recorded and left. When all the image signals of one of the channels are recorded and the signals of the other channel are thinned out and recorded, for example, the image signals picked up by the first CCD image pickup unit 101-1 are completely recorded while the image signals picked up by the second CCD image pickup unit 101-2 are thinned out and recorded. As for thin-out of the data, the recording unit 110 may execute this thin-out. Alternatively, it is possible to thin out the data inside the camera signal processing unit 104 so as not to output all the data to the recording unit 110. When the image signal is compressed and recorded in the recording unit 110, the compression ratio of the image signals picked up by the first CCD image pickup unit 101-1 is preferentially lowered.

As described above, this embodiment preferentially records the image signal picked up by the CCD image pickup unit not holding the charge/signal in the vertical CCD by masking the vertical transfer signal and the readout signal and can preserve the high quality image as the recorded data.

Embodiment 5

Figure 9:
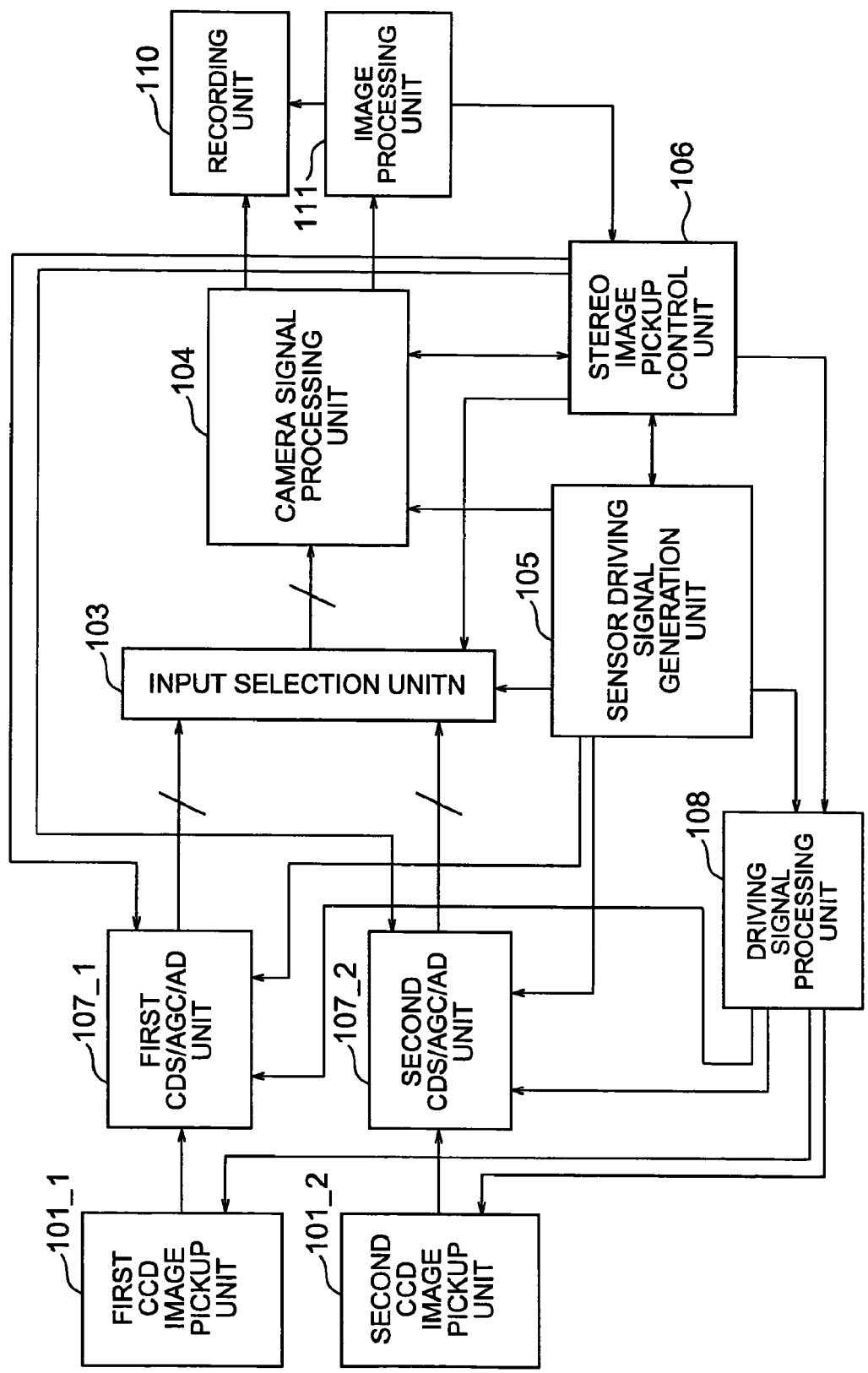
FIG. 9 is a schematic view showing a stereo image pickup system according to a fifth embodiment of the invention.

FIG. 9 is a schematic view showing a stereo image pickup system according to the fifth embodiment of the invention. Reference numeral 110 in FIG. 9 denotes an image processing unit.

FIG. 9 is a view showing another form of the stereo image pickup system according to the first embodiment of the invention. In comparison with FIG. 4, this system has an image processing unit 111 and the recording unit 110 that is explained with reference to the fourth embodiment. The image processing unit 111 executes an image processing by using the image signals that are stereo picked up. When any problem occurs in the image signal picked up by the first CCD image pickup unit 101-1 in which the vertical CCD does not hold the charge/signal by masking the vertical transfer signal and the readout signal as a result of the image processing, such as when the image processing or monitor capacity drops because an obstacle exists in front of the first CCD image pickup unit 101-1 and the back cannot be imaged, for example, the CCD image pickup unit that does not hold the charge/signal in the vertical CCD by masking the vertical transfer signal and the readout signal is switched from the first CCD image pickup unit 101-1 to the second VVD image pickup unit. This can be achieved by outputting the control signal from the image processing unit 111 to the stereo image pickup control unit 106 and by switching, in the stereo image pickup control unit 106, the object of masking the readout signal and the vertical transfer signal, the object of masking the reference level sampling control signal of black, the object of masking the horizontal transfer signal and the reset gate clock signal, the object of masking the clock signal, the object of masking incident light by the shutter unit 109 and the image signal preferentially recorded by the recording unit 110. In this way, it becomes possible for the camera picking up the image suitable for the image processing and monitoring to conduct imaging and recording with high image quality. This switching operation can be conducted in synchronism with the exposure period of the camera L or in synchronism with the GOP period when the compression processing is executed by using the screen correlation such as MPEG in the recording unit 10. The data and the image processed in the image processing unit 111 may be recorded in the recording unit 110. Because this embodiment can arbitrarily select a camera having high image quality, camera selection becomes possible by using information on viewer's dominant eye inputted from outside and the image having high image quality can be inputted to the dominant eye of the viewer.

As described above, this embodiment switches the camera for holding the charge and the signal in the vertical CCD by masking the vertical transfer signal and the readout signal in accordance with the result of the image processing, can pick up the image having high quality by using the camera picking up suitable images and can improve the image processing and monitor capacity.

Next, a stereo image pickup method using three image pickup units will be explained.

Embodiment 6

Figure 10:
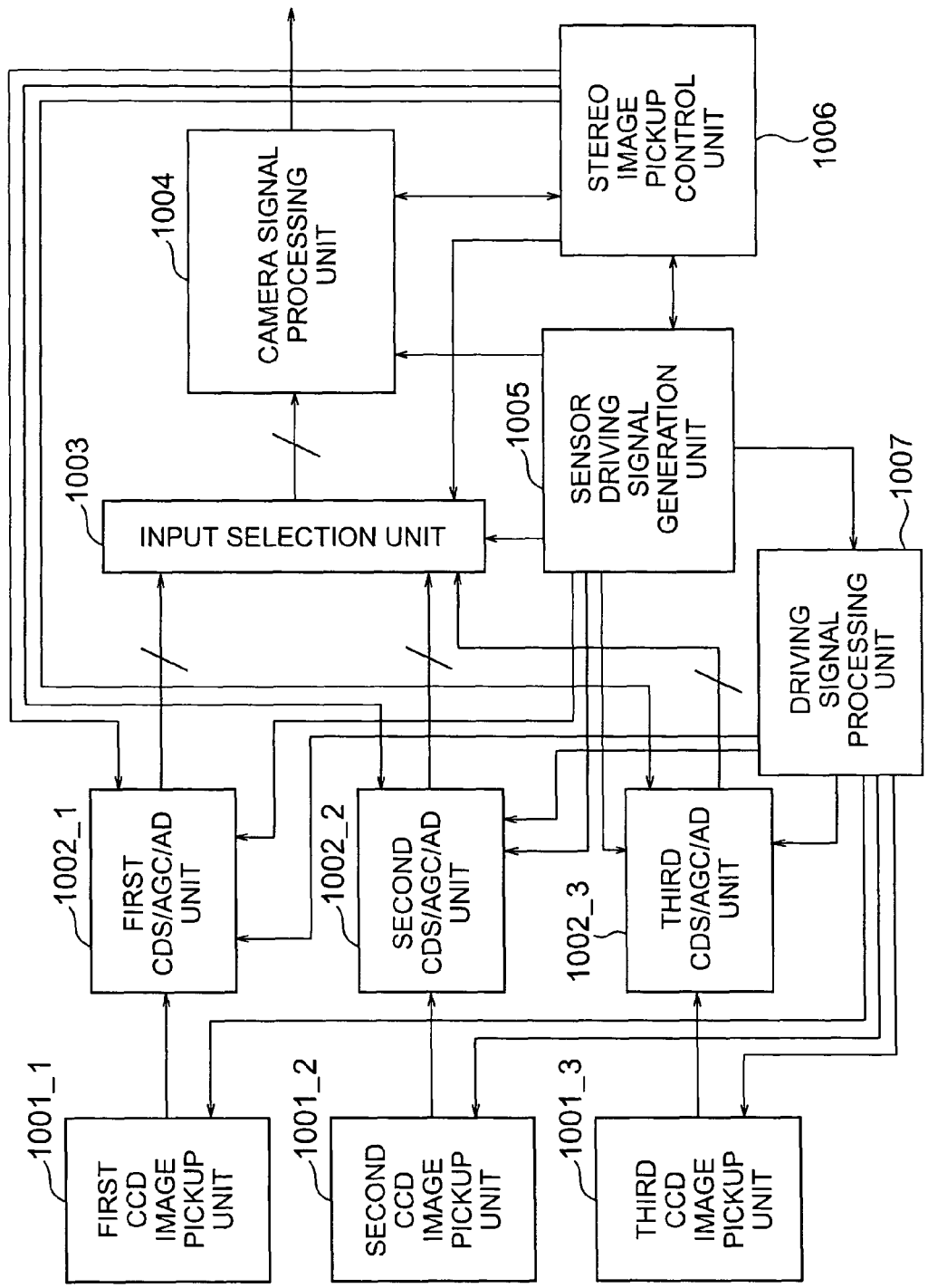
FIG. 10 is a schematic view showing a stereo image pickup system according to a sixth embodiment of the invention.

FIG. 10 is a schematic view showing a stereo image pickup system according to the sixth embodiment of the invention. In FIG. 10, reference numeral 1001-1 denotes a first CCD image pickup unit. Reference numeral 1001-2 denotes a second CCD image pickup unit. Reference numeral 1001-3 denotes a third image pickup unit. Reference numeral 1002-1 is a first CDS/AGC/AD unit. Reference numeral 1002-2 denotes a second CDS/AGC/AD unit. Reference numeral 1002-3 denotes a third CDS/AGC/AD unit. Reference numeral 1003 denotes an input selection unit. Reference numeral 004 denotes a camera signal processing unit. Reference numeral 1005 denotes a sensor driving signal generation unit. Reference numeral 1006 denotes a stereo image control unit. Reference numeral 1007 denotes a driving signal processing unit.

In the stereo image pickup system, the first CCD image pickup unit 1001-1 picks up the images by photoelectric conversion and outputs first analog signals. The first CDS/AGC/AD unit 1002-1 executes correlative double sampling, gain control by the control from the stereo image control unit 1006 and AD conversion for the first analog signals outputted by the first CCD image pickup unit 1001-1 and outputs first digital signals. The second CCD image pickup unit 1001-2 conducts image pickup by photoelectric conversion and outputs second analog signals. The second CDS/AGC/AD unit 1002-3 executes correlative double sampling, gain control by the control from the stereo image control unit 1006 and AD conversion for the second analog signals outputted by the second CCD image pickup unit 1001-2 and outputs second digital signals. The third CCD image pickup unit 1001-3 conducts image pickup by photoelectric conversion and outputs third analog signals. The third CDS/AGC/AD unit 1002-3 executes correlative double sampling, gain control by the control from the stereo image control unit 1006 and AD conversion for the third analog signals outputted by the third CCD image pickup unit 1001-3 and outputs third digital signals. The input selection unit 1003 executes the selection processing for the first digital signals outputted by the first CDS/AGC/AD unit 1002-1, the second digital signals outputted by the second CDS/AGC/AD unit 1002-2 and the third digital signals outputted by the third CDS/AGC/AD unit 1002-3 and selects and outputs the digital signals. The camera signal processing unit 1004 executes camera signal processing such as a filter processing, a de-mosaic processing, a carrier removal processing, an enhancing processing, and so forth, and outputs image signals. The sensor driving signal generation unit 1005 generates signals for driving or control and outputs them to the first CDS/AGC/AD unit 1002-1, the second CDS/AGC/AD unit 1002-2, the third CDS/AGC/AD unit 1002-3, the input selection unit 1003, the camera signal processing unit 1004, the stereo image pickup control unit 1006 and the driving signal processing unit 1007. The stereo image pickup control unit 1006 controls the first CDS/AGC/AD unit 1002-1, the second CDS/AGC/AD unit 1002-2, the third CDS/AGC/AD unit 1002-3, the input selection unit 1003, the camera signal processing unit 1004 and the sensor driving signal generation unit 1005. The driving signal processing unit 1007 outputs the sensor driving signal prepared by executing the distribution processing and the mask processing for one kind of ordinary CCD driving pulses outputted from the sensor driving signal generation unit to the first CCD image pickup unit 1001-1, the second CCD image pickup unit 1001-2 and the third CCD image pickup unit 1001-3. Further, the driving signal processing unit 1007 outputs the control pulse prepared by executing the distribution processing and the mask processing for the control pulses outputted from the sensor driving signal generation unit 1005 to the first CDS/AGC/AD unit 1002-1, the second CDS/AGC/AD unit 1002-2 and the third CDS/AGC/AD unit 1002-3.

Figure 11:
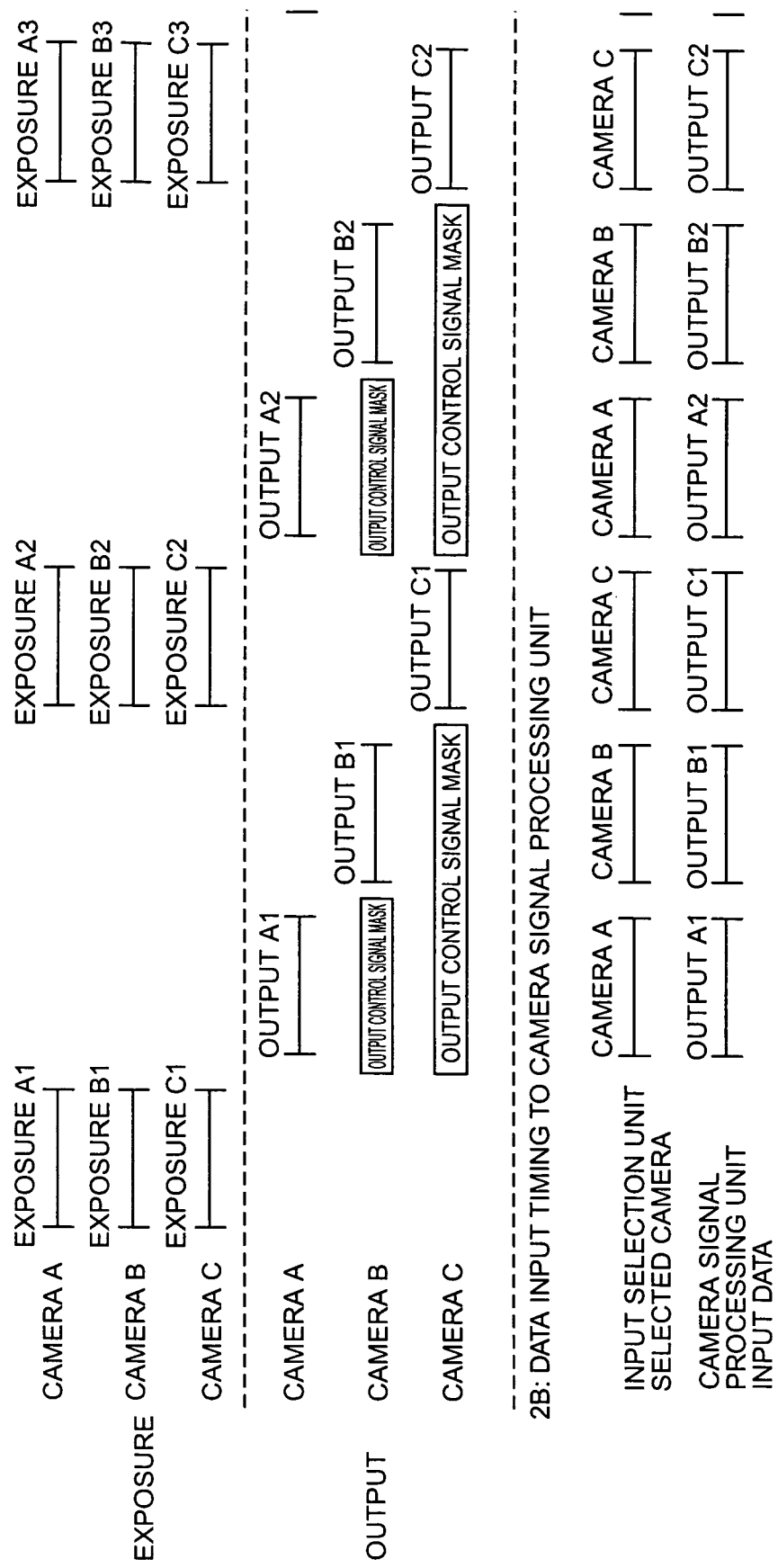
FIG. 11 is a view showing an example of exposure and signal processing timing of the stereo image pickup system according to the sixth embodiment of the invention.

FIG. 11 is a view showing an example of exposure and signal processing timing of the stereo image pickup system according to the sixth embodiment of the invention. In FIG. 11, reference numeral 2A denotes exposure and data output timing and 2B denotes data input timing to the camera signal processing unit.

When the CCD driving pulse subjected to the distribution processing and the mask processing in the driving signal processing unit 1007 is used, that is, when the output control signal is masked, it becomes possible to output the data exposed simultaneously by the camera A, the camera B and the camera C at mutually different timing as shown in "2A: exposure and data output timing". The input selection unit 1003 times the switching of the to-be-selected signal to the timing of the output data outputted at different timing from the camera A, the camera B and the camera C as shown in "2B: data input timing to camera signal processing unit". The timing control of the selection signal switching processing can be easily achieved by using the control signal from the stereo image pickup control unit 1006 and the VD signal. By timing the execution of the selection processing in the input selection processing unit 1003 to the signal output timing of the camera A, the camera B and the camera C, the input signal to the camera signal processing unit 1004 can be switched on the time division basis as shown in "FIG. 11-2B: data input timing to camera signal processing unit". The signal processing can be therefore made by one camera signal processing means for the three CCD image pickup units executing simultaneous exposure. In consequence, the cost can be reduced by deleting the signal processing unit and accuracy can be improved by executing the image processing by using high image quality owing to the simultaneous exposure.

As described above, this embodiment masks the output control signal to the CCD image pickup units after the simultaneous exposure to deviate the signal output timing so as to select the input signal to the camera signal processing unit at a timing which coincides with the signal output timing. When the three image pickup units are used, too, the image pickup data simultaneously exposed can be processed by one camera signal processing unit. Consequently, the cost can be reduced and the image processing capacity of the stereo pickup image can be improved by executing the image processing by using high image quality owing to the simultaneous exposure.

Embodiment 7

Figure 12:
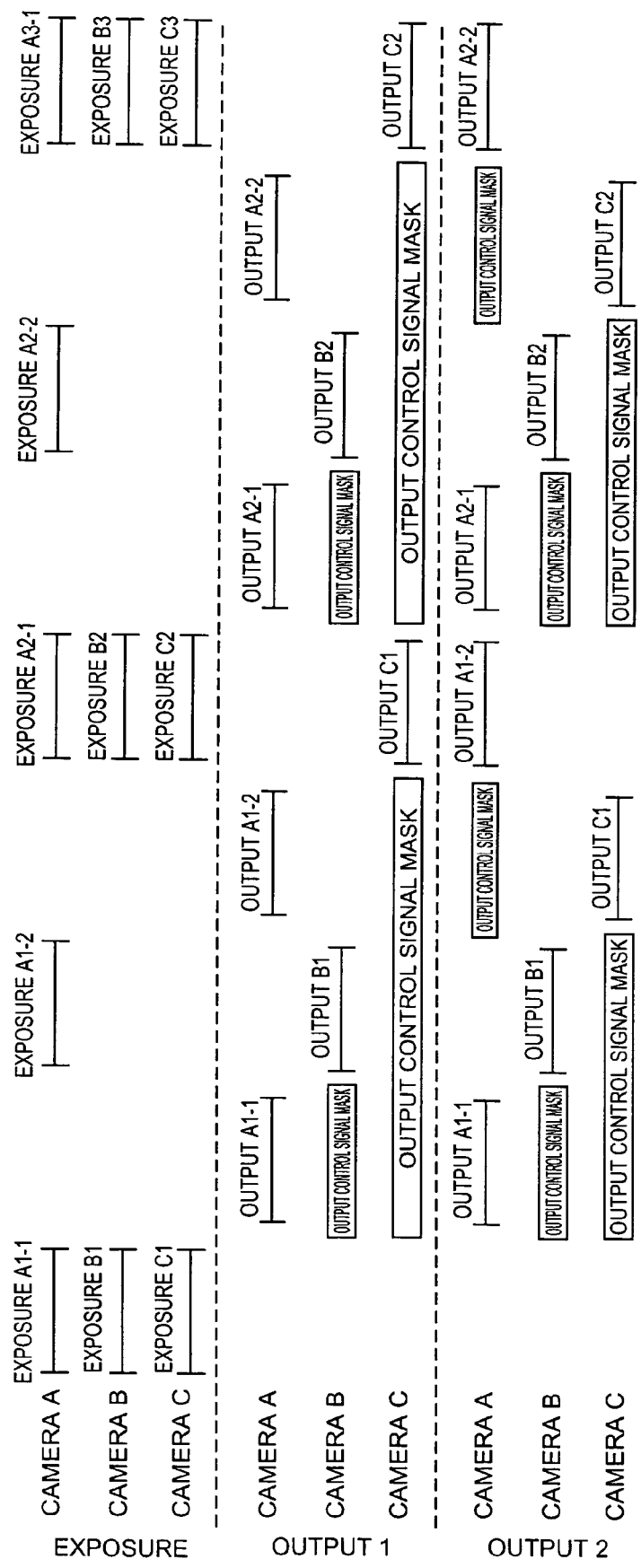
FIG. 12 is a view showing an example of exposure and signal processing timing of a stereo image pickup system according to a seventh embodiment of the invention.

FIG. 12 is a view showing an example of exposure and signal processing timing of a stereo image pickup system according to the seventh embodiment of the invention. In FIG. 12, reference numeral 3A denotes exposure and data output timing and 3B denotes data input timing to the camera signal processing unit.

In comparison with FIG. 11 showing the sixth embodiment of the invention, exposure of the camera A is not only exposure A1-1 that is simultaneously made with the camera B and the camera C but also exposure A1-2 at a different timing and data is outputted in FIG. 12. When the method shown in FIG. 12 is used, camera A can conduct image pickup a greater number of times than the camera B and the camera C and dynamic resolution of the output image data of the camera A can be improved. When a CCD capable of outputting images of 60 images/second by progressive readout or frame images of 59.94 image/sec is used for the CCD image pickup unit of each camera, the camera A can acquire frame images of 30 or 29.97 frame/sec in the same way as when a CCD of interlace readout is used even when the input rate to the camera signal processing unit 1004 of each camera drops because the selection processing is executed in the input selection unit 1003, and affinity with the image signal standard such as NTSC is high.

Image quality is deteriorated in some cases by the influences of noise while the vertical CCD holds the charge and the signal by masking the output control signal. Therefore, the data output timing of exposure A1-2 is next to the data output of exposure B1 as indicated by the output 1 in FIG. 12 and image quality of the camera A may be improved by preferentially considering SN of the data output of exposure A1-2. Alternatively, the data output timing may be next to the data output of exposure C1 as indicated by the output 2 in FIG. 12 and SN of the data output of exposure C1 is preferentially taken into account to improve the stereo image pickup processing capacity. In either case, the exposure interval of the camera A can be rendered uniform irrespective of the data output timing of the camera A.

As described above, this embodiment can conduct image pickup a greater number of times by a specific camera and can improve dynamic resolution by outputting the image pickup data exposed at timing different from simultaneous exposure by a plurality of cameras even when three image pickup units are used, too.

Embodiment 8

Figure 13A:
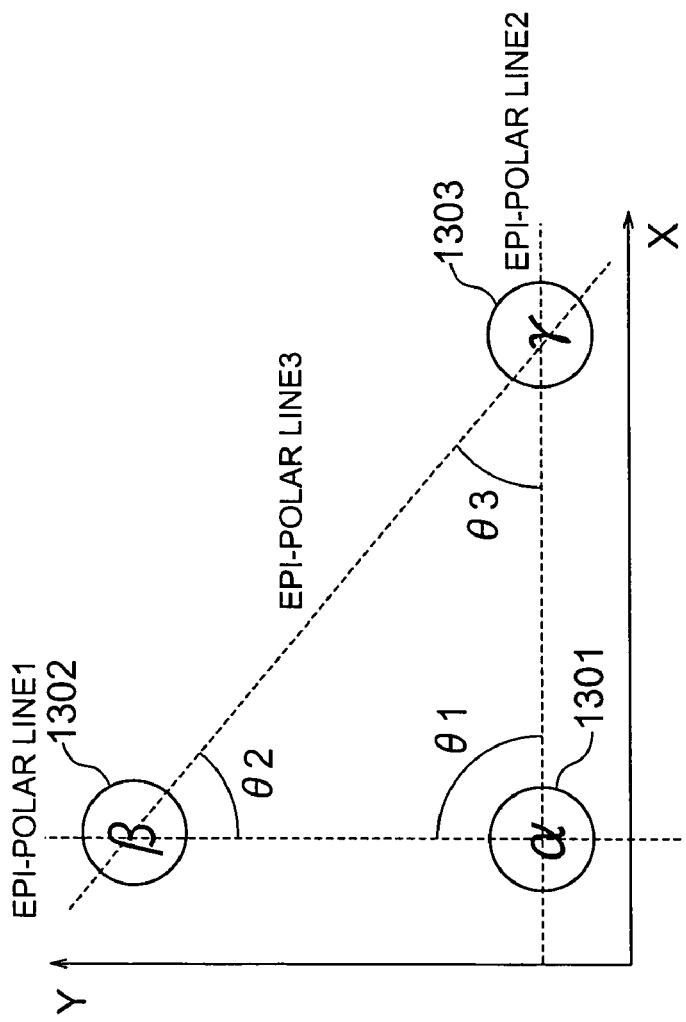
FIGS. 13A and 13B are schematic views each showing a positional relationship of image pickup units of a stereo image pickup system according to an eighth embodiment of the invention.
Figure 13B:
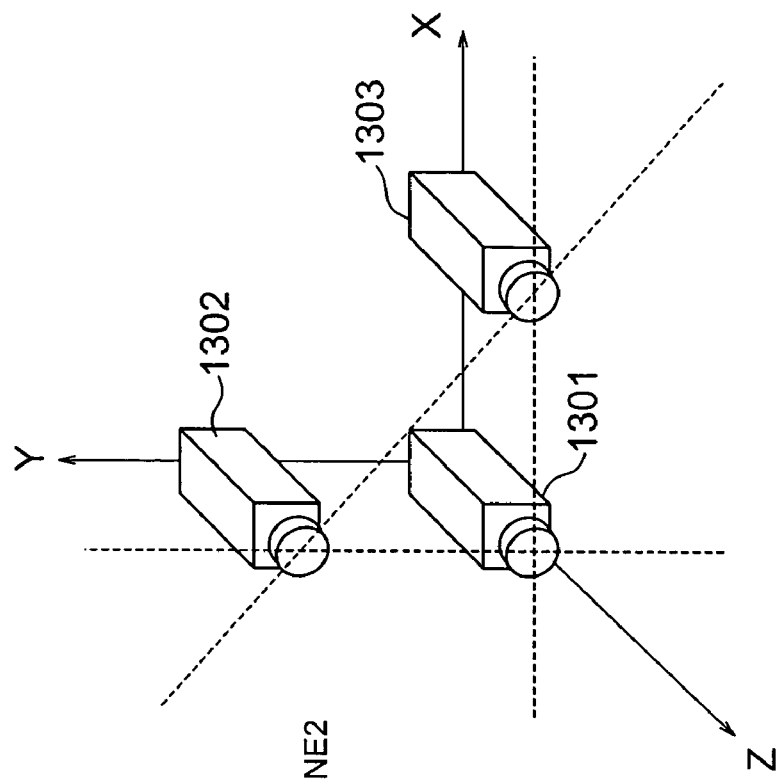

FIGS. 13A and 13B are schematic views each showing a positional relationship of image pickup units in a stereo image pickup system according to the eighth embodiment of the invention. In FIGS. 13A and 13B, reference numeral 1301 denotes a first image pickup unit α, reference numeral 1302 denotes a second image pickup unit β and reference numeral 1303 denotes a third image pickup unit γ.

Assuming hereby that an epi-polar line of the first and second image pickup units α1301 and β1302 is an epi-polar line 1, an epi-polar line of the first and third image pickup units α1301 and γ1303 is an epi-polar line 2 and an epi-polar line of the second and third image pickup units β1302 and γ1303 is an epi-polar line 3, a crossing angle between the epi-polar line 1 and the epi-polar line 2 is θ1, a crossing angle between the epi-polar line 1 and the epi-polar line 3 is θ2 and a crossing angle between the epi-polar line 2 and the epi-polar line 3 is θ3. When the optical axes of the image pickup units are not parallel when the epi-polar lines are determined a described above, the image processing may be executed on the epi-polar line on which correction is made.

In the stereo image pickup system having three image pickup units, the stereo pickup image processing is executed in many cases between the image pickup unit the crossing angle of the epi-polar lines of which is closest to 90 degrees, that is, the first image pickup unit α1301 in FIGS. 13A and 13B, and other two image pickup units, that is, the second and third image pickup units β1302 and γ1303 in FIGS. 13A and 13B. In other words, the stereo image pickup image processing is executed in many cases with the image pickup data of the first image pickup unit α1301 and the second image pickup units β1302 or with the image pickup data of the first image pickup unit α1301 and the third image pickup units γ1303. For, because retrieval of the corresponding point between the two images is executed in the direction of the epi-polar line in the stereo image pickup processing, the epi-polar line that is parallel or orthogonal to the searching direction of the CCD is more appropriate for the processing rate and accuracy.

Image quality is deteriorated in some cases by the influences of noise while the vertical CCD holds the charge and the signal by masking the output control signal. Therefore, the image pickup unit the data of which is used twice in the stereo image pickup image processing, that is, the first image pickup unit α1301 in FIGS. 13A and 13B, is assumed to be the camera A in FIG. 11 showing an example of exposure and signal processing timing of the stereo image pickup system according to the sixth embodiment, that is, the camera the output timing of which is not delayed. Consequently, image quality of the image pickup data used twice in the stereo image pickup processing can be preferentially handled and accuracy of the stereo image processing can be improved.

The camera A in FIG. 12 showing an example of exposure and signal processing timing of the stereo image pickup system according to the seventh embodiment can acquire great quantity of image pickup data. Therefore, image quality can be improved by executing the image processing by using the correlation between the screens. The image pickup unit the data of which is used twice in the stereo image pickup image processing, that is, the first image pickup unit α1301 in FIGS. 13A and 13B, is assumed to be the camera A in FIG. 12 showing an example of exposure and signal processing timing of the stereo image pickup system according to the second embodiment, that is, the camera that executes imaging a great number of times. Consequently, image quality of the image pickup data used twice in the stereo image pickup processing can be preferentially handled and accuracy of the stereo image processing can be improved.

As described above, when the three image pickup units are used, this embodiment can improve accuracy of the stereo image processing by preferentially using the output of the image pickup unit having an angle closest to 90 degrees as the epi-polar line crossing angle or conducting a greater number of times the image pickup operation in the image pickup unit having an angle closest to 90 degrees as the epi-polar line crossing angle.

Embodiment 9

Figure 14:
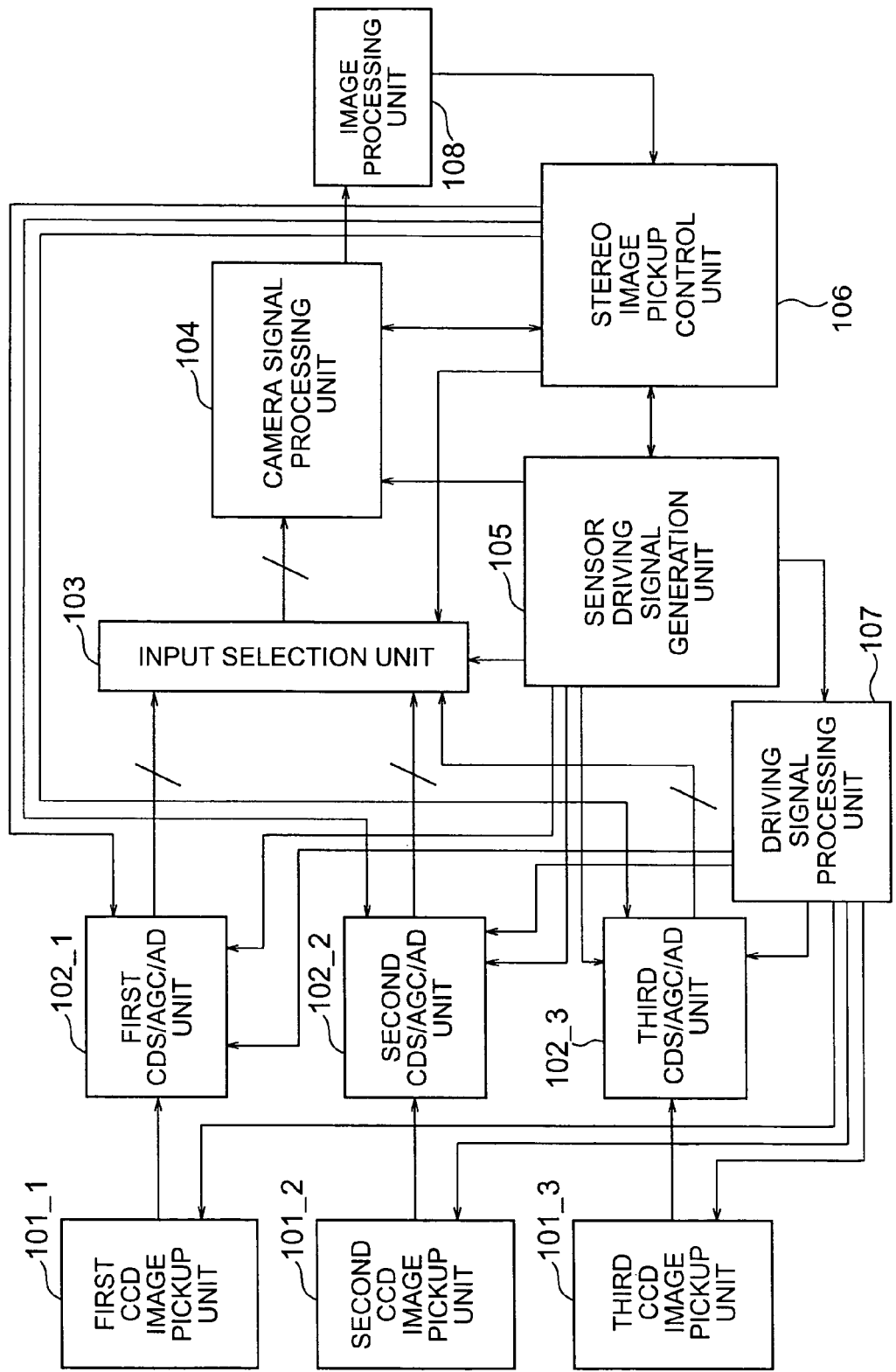
FIG. 14 is a schematic view showing a stereo image pickup system according to a ninth embodiment of the invention.

FIG. 14 is a schematic view showing a stereo image pickup system according to the ninth embodiment of the invention. The system has an image processing unit 108 in comparison with FIG. 10 showing the stereo image pickup unit according to the sixth embodiment of the invention.

As shown in FIG. 14, the image signal outputted from the camera signal processing unit 104 is inputted to the image processing unit 108. The image processing unit 108 executes the stereo image processing such an LP processing using a Gaussian constant as a pre-processing, an edge detection processing and a Laplasian filter processing using a Sobel filter, a Prewitt filter or a Kirsch filter as a feature point detection processing, a corner detection processing using a Moravec operator, a Harris operator or a SUSAN operator, a difference absolute value addition processing or a normalization mutual correlation processing as a correspondence point retrieval processing, a processing for determining a distance from a parallax and a peculiar point removal processing as a post processing. The processing result of the image processing unit 108 is outputted to the stereo image pickup control unit 106 and the stereo image pickup control unit 1096 can control the stereo image pickup unit in accordance with the processing result of the image processing unit 108.

Figure 15:
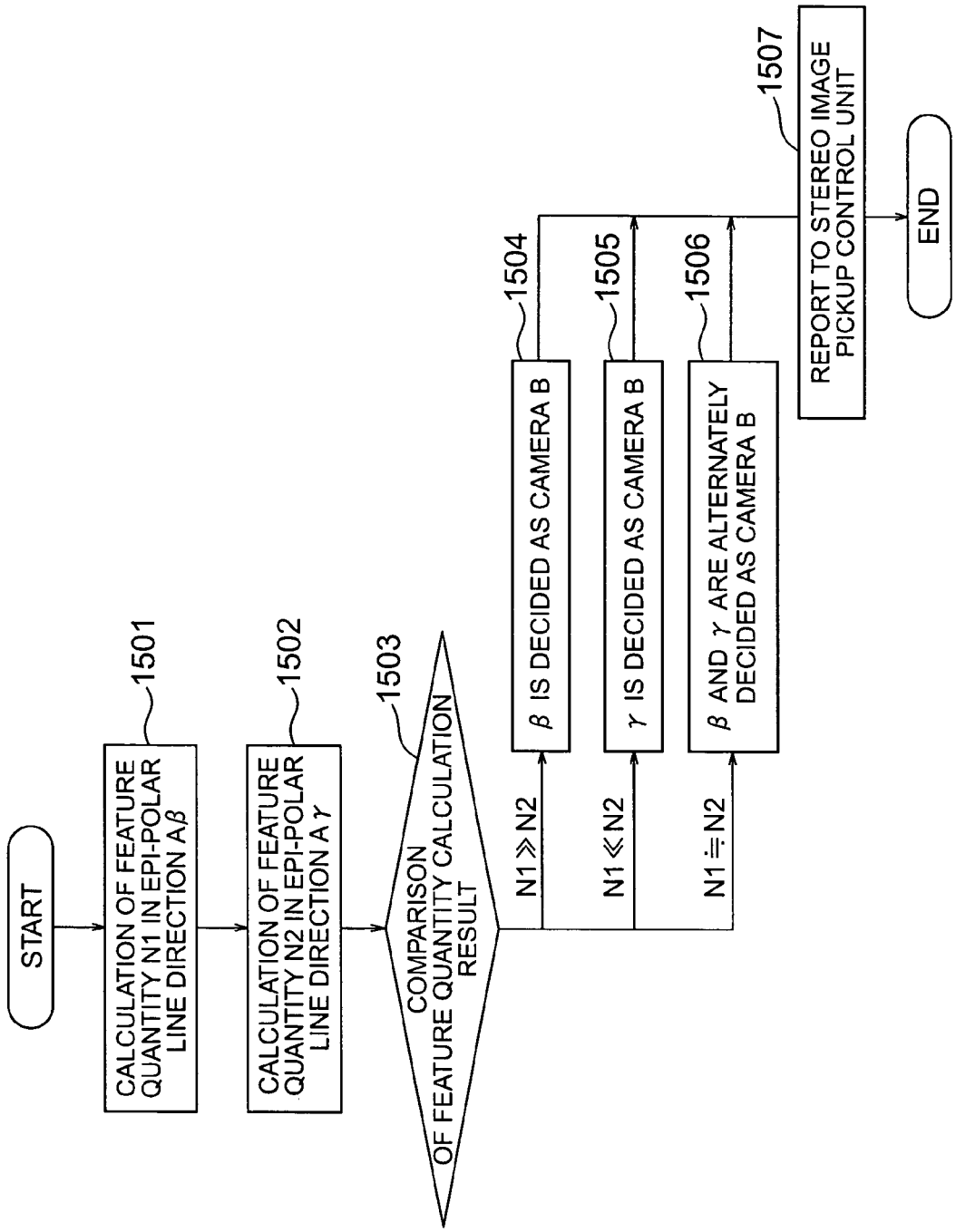
FIG. 15 is a view showing an algorithm of camera control in the ninth embodiment of the invention.

FIG. 15 is a view showing an algorithm of camera control according to the ninth embodiment of the invention. As for the camera A in FIG. 11 showing an example of exposure and signal processing timing of the stereo image pickup system according to the sixth embodiment, the algorithm may be determined by the method illustrated in the eighth embodiment of the invention or may be designated by a user. To execute camera control, the image processing unit 108 executes calculation/evaluation of a feature quantity N1 of the cameras A and B in the direction of the epi-polar line Aβ such as the number of edges having a strength exceeding a certain level in 1501 in FIG. 15. In the next step 1502 in FIG. 15, calculation/evaluation of the feature quantity N2 of the cameras A and γ in the direction Aγ of the epi-polar line A is made. In 1503 in FIG. 15, the feature quantities calculated in 1501 and 1502 are compared. When the feature quantity N1 in the epi-polar line direction Aβ is greater than the feature quantity N2 in the epi-polar line direction Aγ (N1>>N2), the camera is the camera B in FIG. 11 showing an example of exposure and signal processing timing of the stereo image pickup system according to the first embodiment or in FIG. 12 showing an example of exposure and signal processing timing of the stereo image pickup system according to the seventh embodiment as indicated by reference numeral 1504 in FIG. 15. When the feature quantity N1 in the epi-polar line direction Aβ is smaller than the feature quantity N2 in the epi-polar line direction Aγ (N1<<N2), the camera is the camera B in FIG. 11 showing an example of exposure and signal processing timing of the stereo image pickup system according to the sixth embodiment or in FIG. 12 showing an example of exposure and signal processing timing of the stereo image pickup system according to the first embodiment as indicated by reference numeral 1505 in FIG. 15. While the charge/signal is held by the vertical CCD by masking the output control signal, image quality gets deteriorated in some cases. Therefore, the camera having a great feature quantity is the camera B and the holding period by the vertical CCD is shortened. In this way, the image processing in the direction of the epi-polar line having a large feature quantity can be executed with a high SN. When the feature quantity N1 in the epi-polar line direction Aβ is approximately equal to the feature quantity N2 in the epi-polar line direction Aγ (N1≈N2), the camera β and the camera γ may be alternately used as the camera B. Consequently, the image processing in either epi-polar line direction can be executed with a high SN. The selection result of the camera B indicated by 1504 to 1506 in FIG. 15 is reported from the image processing unit 108 to the stereo image control unit 106 in step 1507 in FIG. 15 and the stereo image pickup control unit 106 controls the driving signal for the selection processing of the camera B.

As described above, this embodiment calculates the feature quantity in the direction of each epipolar line and causes the camera in the direction epipolar line direction having a greater feature quantity to preferentially output the image pickup data. In consequence, the image processing in the epipolar line direction having a greater feature quantity can be executed with a high SN and accuracy of distance measurement using the stereo image processing can be improved.

Embodiment 10

Figure 16:
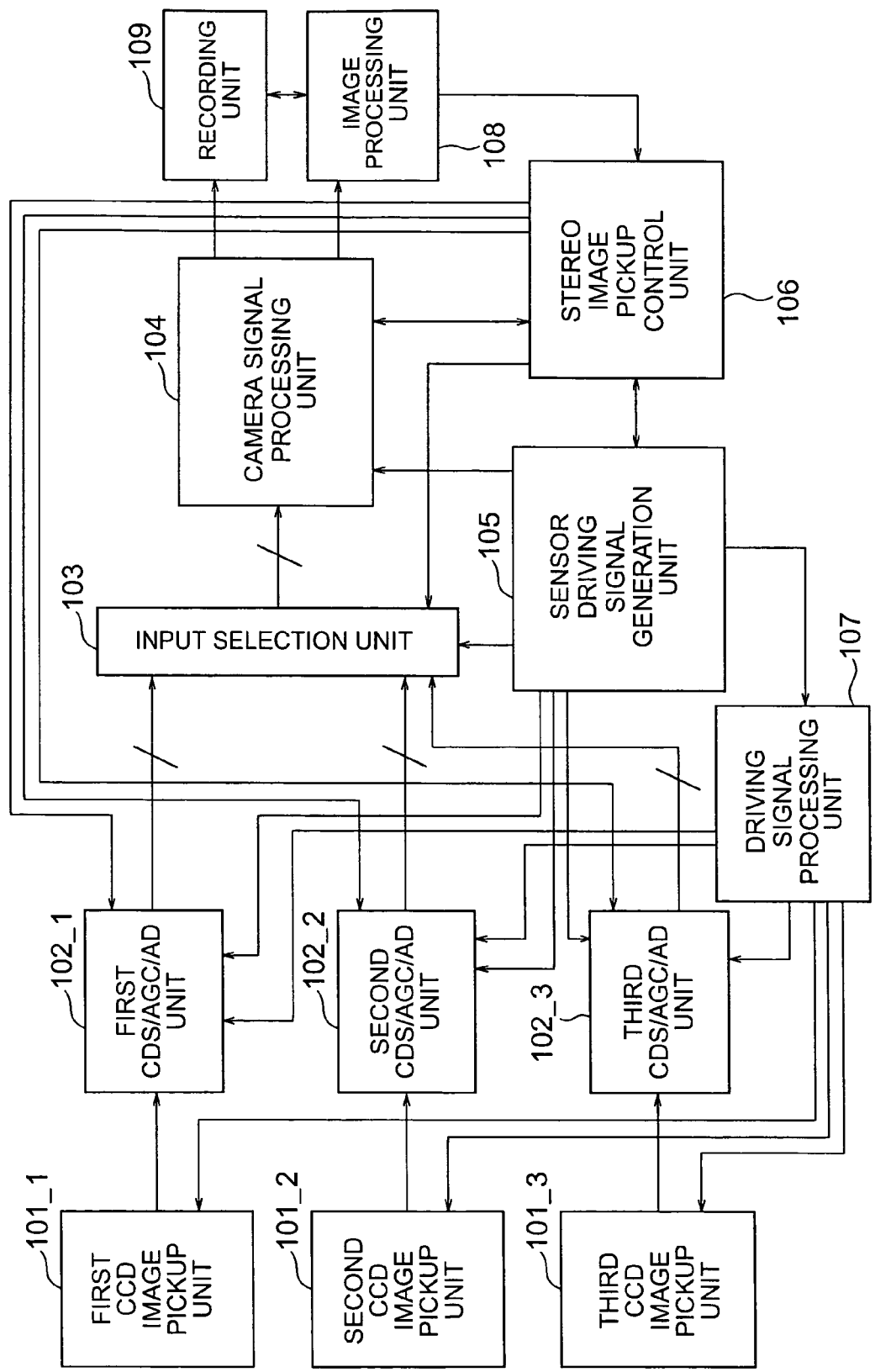
FIG. 16 is a schematic view showing a stereo image pickup system according to a tenth embodiment of the invention.

FIG. 16 is a schematic view showing a stereo image pickup system according to the tenth embodiment of the invention. This system has a recording unit 109 in comparison with the stereo image pickup system according to the ninth embodiment of the invention shown in FIG. 14.

As shown in FIG. 16, the image signal outputted from the camera signal processing unit 104 is inputted to the recording unit 109. The recording unit 109 executes recording of the image signal, that is, the image data. When the recording unit 109 records the image data, recording may be carried out by linking the image processing result by the image processing unit 108 with the image data by inputting the image processing result from the image processing unit 108 to the recording unit 109.

Figure 17:
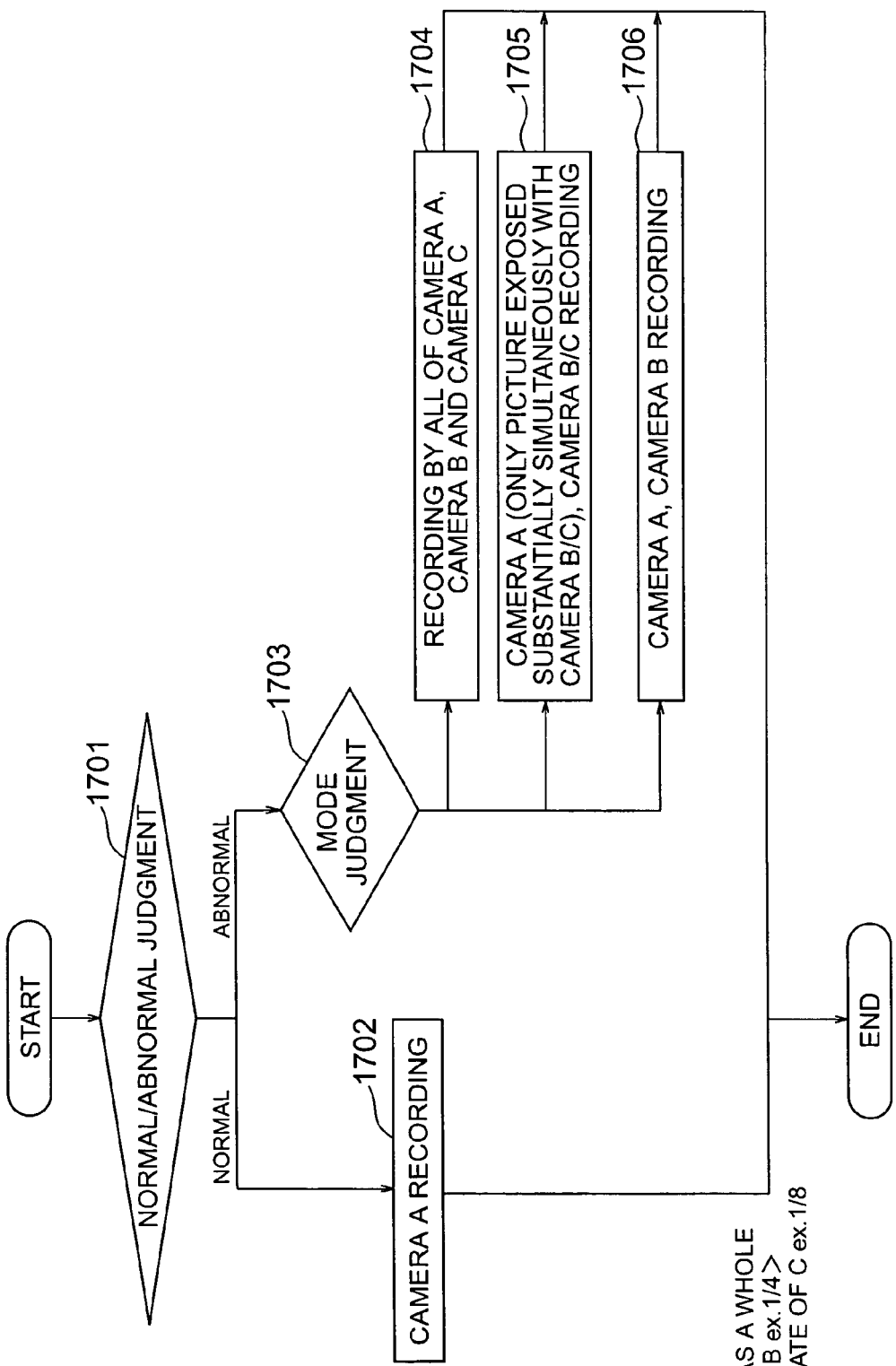
FIG. 17 is a view showing an algorithm of record control in the tenth embodiment of the invention.

FIG. 17 shows an algorithm of recording control according to the tenth embodiment of the invention.

The recording unit 109 executes selection control of the recording data to record the image data. In 1701 in FIG. 17, whether or not the state is normal or abnormal is judged. The information used for this judgment may be inputted from outside or the result of the image processing of the image processing unit 108 such as the existence/absence of an invader or a distance of an object may be used. When the state is judged as being normal as a result of the judgment in 1701 in FIG. 17, recording of the image of the single camera such as the camera A having the highest image quality is made. When the state is judged as being abnormal as a result of the judgment in 1701 in FIG. 17, recording of a plurality of cameras is made. The image data of all the cameras shown in 1704 in FIG. 17, that is, the camera A, the camera B and the camera C may be recorded. Alternatively, only the image exposed at substantially equal timing by all the cameras as shown in 1705 in FIG. 17 may be recorded or the image of the camera having a great feature quantity in the epi-polar line direction may be recorded as indicated by 1706 in FIG. 17. The selection of such a recording method is made in 1703 in the drawing and may be decided by using information from an external input or by the judgment of the degree of abnormality using the image processing result of the image processing unit 108. When the image data of each camera is recorded, the data that is thinned out in a predetermined interval is recorded and the recording data quantity and the recording band may thus be reduced. When the image data of a plurality of cameras is recorded in case of emergency, the image processing can be executed once again later and the image processing can be executed with a sufficient time by an algorithm different from the image processing using the algorithm for executing the ordinary real time image processing. In other words, the image processing can be executed by using a high performance image processing algorithm with a sufficient time without relying on a simple algorithm that puts priority to the real time performance. It is thus possible to improve accuracy of the image processing result at the time of the occurrence of abnormality such as accuracy of the size of the object. Such a re-processing of images using the recording data may be executed by a PC or a WS by copying the image data by the PC or WS without using the stereo image pickup system illustrated in this embodiment. When the judgment result proves wrong when abnormality is judged by using the image processing result of the image processing 108 (such as when a dog is judged as people or the state is judged as being abnormal though it is not abnormal), too, the algorithm can be verified by using the image data recorded. Therefore, this is helpful to analyze the wrong detection and detection problems and reliability of the stereo image processing system can be improved in the long run.

As described above, this embodiment can again execute the stereo image processing by using the image later recorded by recording the images of a plurality of cameras in case of emergency, and the system is suitable as sensing means of a monitor system.

Embodiment 11

Figure 18:
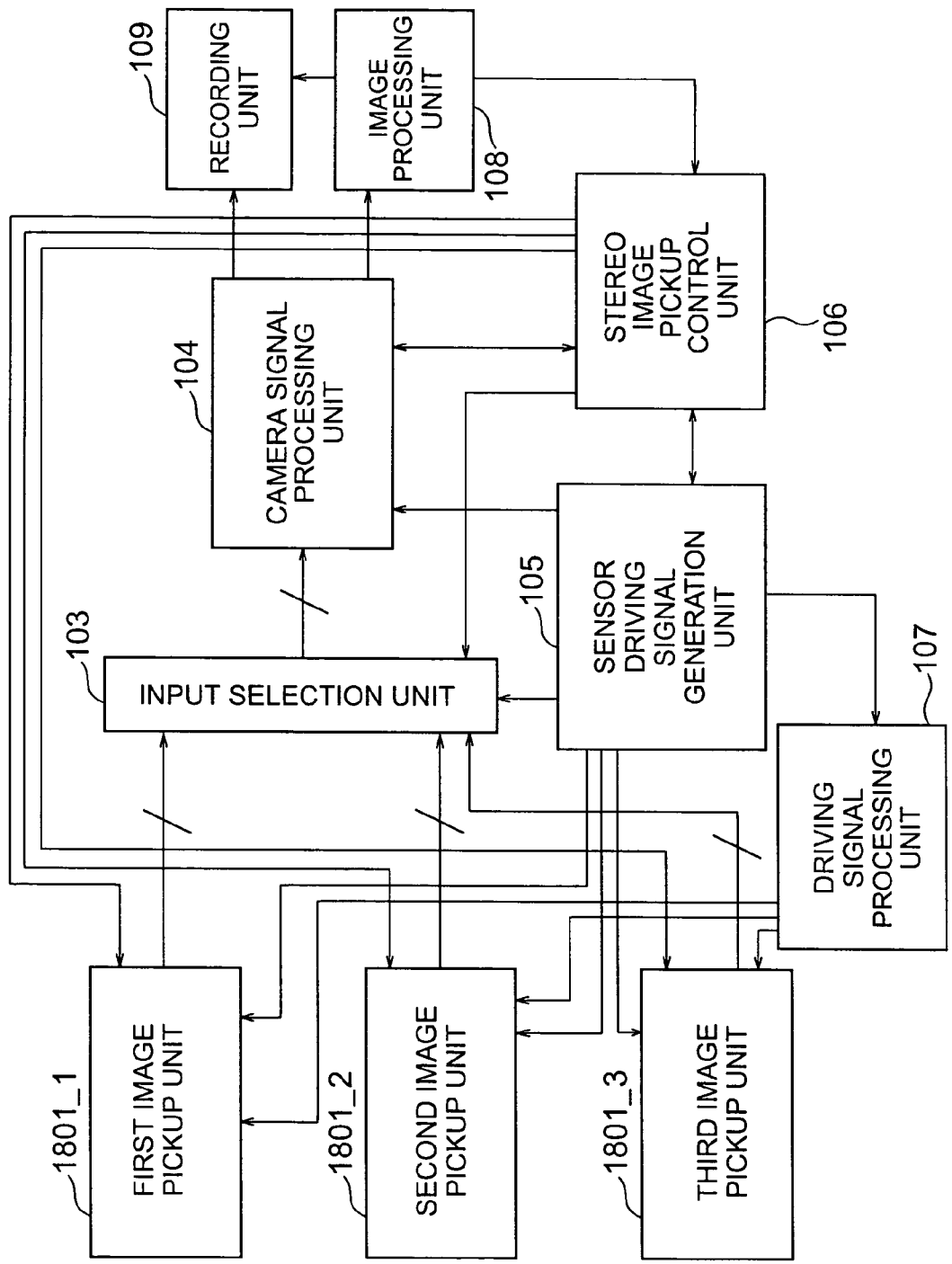
FIG. 18 is a schematic view showing a stereo image pickup system according to an eleventh embodiment of the invention.

FIG. 18 is a schematic view showing a stereo image pickup system according to the eleventh embodiment of the invention. In comparison with FIG. 16 showing the stereo image pickup system according to the tenth embodiment of the invention, the system shown in FIG. 18 includes a first image pickup unit 1801-1, a second image pickup unit 1801-2 and a third image pickup unit 1801-3 in place of the first CCD image pickup unit 101-1, the second CCD image pickup unit 101-2, the third CCD image pickup unit 101-3, the first CDS/AGC/AD unit 102-1, the second CDS/AGS/AD unit 102-2 and the third CDS/AGC/AD unit 102-3.

In FIG. 18, each of the first image pickup unit 1801-1, the second image pickup unit 1801-2 and the third image pickup unit 1801-3 may be constituted by using a CMOS type image pickup device. In the CMOS type image pickup device, too, signals can be simultaneously read to FD amplifiers for all pixels by providing the FD amplifier to each pixel and so-called "global shutter" can be achieved. Consequently, exposure can be made at substantially equal timing in each image pickup unit. The image pickup data simultaneously exposed can be subjected to the camera signal processing in one camera signal processing unit when the CMOS type image pickup device is used, by making the signal readout timing of each image pickup unit different and causing the FD amplifier to hold the signal.

According to the embodiment described above, the image pickup data simultaneously exposed can be subjected to the camera signal processing by one camera signal processing unit by holding the signal in each FD amplifier to make the signal output timing to each image pickup means different so as to select the input signal to the camera signal processing unit at a timing coincident with the signal output timing even when the CMOS type imaging device is used as the image pickup means. Consequently, the cost can be reduced and image quality by simultaneous exposure and the image processing capacity of stereo image pickup by using the images picked up can be improved.

The foregoing embodiments 6 to 11 represent the case where the three image pickup units are used but can also be applied to the case where four or more image pickup units are used. When two image pickup units are movably constituted (rotation, for example), control can be made in the same way as in stereo image pickup using three or more image pickup units.

With the foregoing embodiments, image pickup apparatuses having a plurality of image pickup means can be achieved that are in low cost and with improved image quality.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image pickup apparatus comprising:
   a first CCD image pickup unit which picks up images;
   a first CDS/AD unit which executes correlative double sampling and AD conversion for signals outputted by said first CCD image pickup unit and outputting digital signals;
   a second CCD image pickup unit which picks up images;
   a second CDS/AD unit which executes correlative double sampling and AD conversion for signals outputted by said second CCD image pickup unit and outputting digital signals;
   an input selection unit which executes selection processing for each of the digital signals outputted by said first CDS/AD unit and said second CDS/AD unit, and selecting and outputting one of said digital signals;
   a camera signal processing unit which executes camera signal processing for the digital signal outputted by said input selection unit and outputting image signals;
   a sensor driving pulse generation unit which generates and outputs signals for executing driving or control to said first CCD image pickup unit and said first CDS/AD unit, said second CCD image pickup unit and said second CDS/AD unit, said input selection unit, said camera signal processing unit and said stereo image pickup control unit; and
   a stereo image pickup control unit which controls said input selection unit, said camera signal processing unit and said sensor driving pulse generation unit;

wherein outputting timing of image pickup data of said second CCD image pickup unit is retarded by masking a readout signal and a vertical transfer signal outputted by said sensor driving pulse unit for driving said second CCD image pickup unit and holding signals in a vertical CCD.

2. An image pickup apparatus according to claim 1, wherein the period in which the readout signal and the vertical transfer signal outputted by said sensor driving pulse unit are masked is the period in which said signal selection unit selects the signal outputted by said first CDS/AD unit or said first CDS/AGC/AD unit.

3. An image pickup apparatus according to claim 1, wherein a black reference level sampling control signal outputted by said sensor driving pulse generation unit to said second CDS/AD unit or said second CDS/AGC/AD unit is masked, too, for the period during which the readout signal and the vertical transfer signal outputted by said sensor driving pulse generation unit are masked.

4. An image pickup apparatus according to claim 3, wherein said image pickup unit includes an image processing unit which processes images, and an object for which the black reference level sampling control signal outputted by said sensor driving pulse unit is masked is switched by said first CDS/AD unit or said first CDS/AGC/AD unit and said second CDS/AD unit or said second CDS/AGC/AD unit in accordance with the image processing result of said image processing unit.

5. An image pickup apparatus according to claim 1, wherein a horizontal transfer signal and a reset gate clock signal outputted by said sensor driving pulse unit to said second CCD image pickup unit and a clock signal and a pre-blanking signal outputted by said sensor driving pulse generation unit to said second CDS/AD unit or said second CDS/AGC/AD unit are masked for the period during which the readout signal and the vertical transfer signal outputted by said sensor driving pulse generation unit are masked.

6. An image pickup apparatus according to claim 5, wherein said image pickup unit includes an image processing unit which processes images, an object for which the horizontal transfer signal and the reset clock gate signal outputted by said sensor driving pulse unit are masked is switched by said first CCD image pickup unit and said second CCD image pickup unit, and an object for which the clock signal and the pre-blanking signal outputted by said sensor driving pulse unit are masked is switched by said first CDS/AD unit or said first CDS/AGC/AD unit and said second CDS/AD unit or said CDS/AGC/AD unit in accordance with the image processing result of said image processing unit.

7. An image pickup apparatus according to claim 1, wherein said image pickup unit includes a shutter unit which cuts off light, and incident light to said second CCD image pickup unit is cut off by using said shutter unit for the period during which the readout signal and the vertical transfer signal outputted by said sensor driving pulse unit are masked.

8. An image pickup apparatus according to claim 7, wherein said image pickup unit includes an image processing unit which processes images, and an object for which incident light is cut off by said shutter unit is switched by said first CCD image pickup unit and said second CCD image pickup unit in accordance with the image processing result of said image processing unit.

9. An image pickup apparatus according to claim 1, wherein said image pickup unit includes a recording unit which records image data, and images picked up by said first CCD image pickup unit are preferentially recorded when the image signals outputted by said camera signal processing unit are recorded by said recording unit.

10. An image pickup apparatus according to claim 9, wherein said image pickup unit includes an image processing unit which processes images, and an image signal preferentially recorded by said recording unit is switched by the image picked up by said first CCD image pickup unit and the image picked up by said second CCD image pickup unit in accordance with the image processing result of said image processing unit.

11. An image pickup apparatus according to claim 1, wherein said image pickup unit includes an image processing unit which processes images, and an object for which the readout signal and the vertical transfer signal outputted by said sensor driving pulse unit are masked is switched by said first CCD image pickup unit and said second CCD image pickup unit.

12. An image pickup apparatus comprising:
a first CCD image pickup unit which picks up images;
a first CDS/AGC/AD unit which executes correlative double sampling, gain control and AD conversion for signals outputted by said first CCD image pickup unit and outputting digital signals;
a second CCD image pickup unit which picks up images;
a second CDS/AGC/AD unit which executes correlative double sampling, gain control and AD conversion for signals outputted by said second CCD image pickup unit and outputting digital signals;
an input selection unit which executes selection processing for each of the digital signals outputted by said first CDS/AGC/AD unit and said second CDS/AGC/AD unit, and selects and outputs one of said digital signals;
a camera signal processing unit which executes camera signal processing for the digital signal outputted by said input selection unit and outputting image signals;
a driving signal processing unit which executes distribution and mask processing for the sensor driving pulse outputted by said sensor driving pulse generation unit and the CDS/AGC/AD unit control pulse;
a sensor driving pulse generation unit which generates and outputs signals for executing driving or control to said driving signal processing unit, said first CDS/AGC/AD unit, said second CDS/AGC/AD unit, said input selection unit, said camera signal processing unit and said stereo image pickup control unit; and
a stereo image pickup control unit which controls said first CDS/AGC/AD unit, said second CDS/AGC/AD unit, said input selection unit, said camera signal processing unit and said sensor driving pulse generation unit;
wherein outputting timing of image pickup data is rendered different by masking a readout signal and a vertical transfer signal outputted by said driving signal processing unit to said second CCD image pickup unit for the sensor driving pulse outputted by said sensor driving pulse generation unit, and holding signals in a vertical CCD.

13. An image pickup apparatus according to claim 12, wherein the period in which the readout signal and the vertical transfer signal outputted by said sensor driving pulse unit are masked is the period in which said signal selection unit selects the signal outputted by said first CDS/AD unit or said first CDS/AGC/AD unit.

14. An image pickup apparatus according to claim 12, wherein a black reference level sampling control signal outputted by said sensor driving pulse generation unit to said second CDS/AD unit or said second CDS/AGC/AD unit is masked, too, for the period during which the readout signal and the vertical transfer signal outputted by said sensor driving pulse generation unit are masked.

15. An image pickup apparatus according to claim 12, wherein a horizontal transfer signal and a reset gate clock signal outputted by said sensor driving pulse unit to said second CCD image pickup unit and a clock signal and a pre-blanking signal outputted by said sensor driving pulse generation unit to said second CDS/AD unit or said second CDS/AGC/AD unit are masked for the period during which the readout signal and the vertical transfer signal outputted by said sensor driving pulse generation unit are masked.

16. An image pickup apparatus according to claim 12, wherein said image pickup unit includes a shutter unit which cuts off light, and incident light to said second CCD image pickup unit is cut off by using said shutter unit for the period during which the readout signal and the vertical transfer signal outputted by said sensor driving pulse unit are masked.

17. An image pickup apparatus according to claim 12, wherein said image pickup unit includes a recording unit which records image data, and images picked up by said first CCD image pickup unit are preferentially recorded when the image signals outputted by said camera signal processing unit are recorded by said recording unit.

18. An image pickup apparatus according to claim 12, wherein said image pickup unit includes an image processing unit which processes images, and an object for which the readout signal and the vertical transfer signal outputted by said sensor driving pulse unit are masked is switched by said first CCD image pickup unit and said second CCD image pickup unit.

19. An image pickup apparatus comprising:
a first CCD image pickup unit which picks up images;
a first CDS/AGC/AD unit which executes correlative double sampling, gain control and AD conversion for signals outputted by said first CCD image pickup unit and outputting digital signals;
a second CCD image pickup unit which picks up images;
a second CDS/AGC/AD unit which executes correlative double sampling, gain control and AD conversion for signals outputted by said second CCD image pickup unit and outputs digital signals;
a third CCD image pickup unit which picks up images;
a third CDS/AGC/AD unit which executes correlative double sampling, gain control and AD conversion for signals outputted by said third CCD image pickup unit and outputs digital signals;
an input selection unit which executes selection processing for each of the digital signals outputted by said first CDS/AGC/AD unit, said second CDS/AGC/AD unit and said third CDS/AGC/AD unit and selects and outputs any one of said digital signals;
a camera signal processing unit which executes camera signal processing for the digital signal outputted by said input selection unit and outputs image signals;
a sensor driving pulse generation unit which generates and outputs signals for executing driving or control to said driving signal processing unit, said first CDS/AGC/AD unit, said second CDS/AGC/AD unit, said third CDS/AGC/AD unit, said input selection unit, said camera signal processing unit and said stereo image pickup control unit;
a driving signal processing unit which executes distribution and mask processing for the sensor driving pulse outputted by said sensor driving pulse generation unit and the CDS/AGC/AD unit control pulse; and
a stereo image pickup control unit which controls said first CDS/AGC/AD unit, said second CDS/AGC/AD unit, said third CDS/AGC/AD unit, said input selection unit, said camera signal processing unit and said sensor driving pulse generation unit;
wherein outputting timing of image pickup data is rendered different by masking a readout signal and a vertical transfer signal outputted by said driving signal processing unit to said second CCD image pickup unit and said third CCD image pickup unit for the sensor driving pulse outputted by said sensor driving pulse generation unit, and holding signals in a vertical CCD.

20. An image pickup apparatus according to claim 19, wherein said image pickup unit that retards the output timing of the image pickup data is an image pickup unit other than the one in which a crossing angle of epi-polar lines of said first CDD image pickup unit, said second image pickup unit and said third image pickup unit is approximate to right angles.

21. An image pickup apparatus according to claim 19, further including an image processing unit which executes image processing of the image data outputted by said camera signal processing unit, and wherein said image processing unit calculates a feature quantity of each epi-polar line direction of the image data of said image pickup unit executing exposure at different timing and preferentially outputs the image pickup data from said image pickup unit existing in an epi-polar line direction having a great feature quantity.

22. An image pickup apparatus according to claim 19, further including a recording unit which records image data and wherein, when said recording unit records the image signals outputted by said camera signal processing unit, the image data of said image pickup unit executing exposure at different timing are normally recorded and the image data of all of said image pickup units are recorded at the time of abnormality.

23. An image pickup apparatus according to claim 19, wherein a CMOS type image pickup unit is used for said image pickup unit.

24. An image pickup apparatus comprising:
a first CCD image pickup unit which picks up images;
a first CDS/AGC/AD unit which executes correlative double sampling, gain control and AD conversion for signals outputted by said first CCD image pickup unit and outputs digital signals;
a second CCD image pickup unit which picks up images;
a second CDS/AGC/AD unit which executes correlative double sampling, gain control and AD conversion for signals outputted by said second CCD image pickup unit and outputs digital signals;
a third CCD image pickup unit which picks up images;
a third CDS/AGC/AD unit which executes correlative double sampling, gain control and AD conversion for signals outputted by said third CCD image pickup unit and outputs digital signals;
an input selection unit which executes selection processing for each of the digital signals outputted by said first CDS/AGC/AD unit, said second CDS/AGC/AD unit and said third CDS/AGC/AD unit and selects and outputs any one of said digital signals;
a camera signal processing unit which executes camera signal processing for the digital signal outputted by said input selection unit and outputs image signals;
a sensor driving pulse generation unit which generates and outputs signals for executing driving or control to said driving signal processing unit, said first CDS/AGC/AD unit, said second CDS/AGC/AD unit, said third CDS/AGC/AD unit, said input selection unit, said camera signal processing unit and said stereo image pickup control unit;

a driving signal processing unit which executes distribution and mask processing for the sensor driving pulse outputted by said sensor driving pulse generation unit and the CDS/AGC/AD unit control pulse; and a stereo image pickup control unit which controls said first CDS/AGC/AD unit, said second CDS/AGC/AD unit, said third CDS/AGC/AD unit, said input selection unit, said camera signal processing unit and said sensor driving pulse generation unit;

wherein said first CCD image pickup unit, said second CCD image pickup unit and said third CCD image pickup unit execute exposure at substantially same timing, wherein outputting timing of image pickup data is rendered different by masking a readout signal and a vertical transfer signal outputted by said driving signal processing unit to said second CCD image pickup unit and said third CCD image pickup unit for the sensor driving pulse outputted by said sensor driving pulse generation unit, and holding signals in a vertical CCD, wherein image pickup data exposed at timing different from said substantially same timing are outputted too.

25. An image pickup apparatus according to claim 24, wherein said image pickup units that execute exposure at different timing are those in which a crossing angle of epi-polar lines of said first CDD image pickup unit, said second image pickup unit and said third image pickup unit is approximate to right angles.

26. An image pickup apparatus according to claim 24, further including an image processing unit which executes image processing of the image data outputted by said camera signal processing unit, and wherein said image processing unit calculates a feature quantity of each epi-polar line direction of the image data of said image pickup unit executing exposure at different timing and preferentially outputs the image pickup data from said image pickup unit existing in an epi-polar line direction having a great feature quantity.

27. An image pickup apparatus according to claim 24, further including a recording unit which records image data and wherein, when said recording unit records the image signals outputted by said camera signal processing unit, the image data of said image pickup unit executing exposure at different timing are normally recorded and the image data of all of said image pickup units are recorded at the time of abnormality.

28. An image pickup apparatus according to claim 24, wherein a CMOS type image pickup unit is used for said image pickup unit.

* * * * *